(12) United States Patent
Yamanashi et al.

(10) Patent No.: US 11,153,153 B2
(45) Date of Patent: Oct. 19, 2021

(54) INFORMATION PROCESSING APPARATUS AND INFORMATION PROCESSING SYSTEM

(71) Applicant: FUJITSU LIMITED, Kawasaki (JP)

(72) Inventors: Haruki Yamanashi, Kawasaki (JP); Koji Nakazono, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/192,851

(22) Filed: Nov. 16, 2018

(65) Prior Publication Data

US 2019/0182100 A1 Jun. 13, 2019

(30) Foreign Application Priority Data

Dec. 12, 2017 (JP) .............................. JP2017-238012

(51) Int. Cl.
*H04L 12/24* (2006.01)
(52) U.S. Cl.
CPC .................................. *H04L 41/069* (2013.01)
(58) Field of Classification Search
CPC .................................................... H04L 41/069
See application file for complete search history.

(56) References Cited

U.S. PATENT DOCUMENTS

| | | | | |
|---|---|---|---|---|
| 8,417,809 | B1 * | 4/2013 | Lancaster | G06F 11/0727 709/224 |
| 9,384,112 | B2 * | 7/2016 | Petersen | G06F 11/327 |
| 10,069,677 | B2 * | 9/2018 | Jagadish | H04L 41/0853 |
| 10,425,277 | B2 * | 9/2019 | Cook | H04L 41/0813 |
| 2015/0281010 | A1 * | 10/2015 | Matsushima | H04L 41/069 709/224 |
| 2015/0358307 | A1 * | 12/2015 | Bitsu | H04W 12/06 726/5 |
| 2016/0283306 | A1 * | 9/2016 | Hayashi | G06F 11/0709 |
| 2017/0005858 | A1 * | 1/2017 | Zhang | G06F 16/907 |
| 2017/0031742 | A1 * | 2/2017 | Jilani | G06F 11/0787 |

(Continued)

FOREIGN PATENT DOCUMENTS

| JP | 2008210073 A * | 8/2008 |
|---|---|---|
| JP | 2008-210073 | 9/2008 |

(Continued)

*Primary Examiner* — William G Trost, IV
*Assistant Examiner* — Monishwar Mohan
(74) *Attorney, Agent, or Firm* — Fujitsu Patent Center

(57) ABSTRACT

An information processing apparatus includes a processor that receives a first log from a first transmission apparatus. The processor determines target log information among plural pieces of log information included in the first log. The target log information is one of first pieces of log information having an occurrence frequency higher than an occurrence frequency of other pieces of log information. The processor assigns an identifier to the target log information. The processor stores log management information indicating a correspondence among the target log information, the identifier, and a first path received together with the first log and indicating a storage location in which the first log is stored. The processor transmits the log management information to a second log transmission apparatus corresponding to the first path. The processor receives, from the second log transmission apparatus, a log in which the target log information is converted into the identifier.

15 Claims, 12 Drawing Sheets

(56) References Cited

U.S. PATENT DOCUMENTS

| | | | |
|---|---|---|---|
| 2017/0034017 A1* | 2/2017 | Ono | G06F 3/1273 |
| 2017/0091062 A1* | 3/2017 | Nishikawa | H04L 41/0654 |
| 2017/0093662 A1* | 3/2017 | Hotta | G06F 21/563 |
| 2017/0094695 A1* | 3/2017 | Nishikawa | G06F 11/3006 |
| 2017/0099178 A1* | 4/2017 | Satoh | H04L 43/0805 |
| 2018/0107593 A1* | 4/2018 | Ogawa | G06F 12/0802 |
| 2018/0167259 A1* | 6/2018 | Kurahashi | G06F 3/1203 |
| 2018/0283913 A1* | 10/2018 | Chen | A61B 5/6833 |
| 2019/0215231 A1* | 7/2019 | Yamane | H04L 43/0852 |

FOREIGN PATENT DOCUMENTS

| | | | |
|---|---|---|---|
| JP | 2008210073 A | * | 11/2008 |
| JP | 2013-025744 | | 2/2013 |
| JP | 2014-016758 | | 1/2014 |
| JP | 2014016758 A | * | 1/2014 |

* cited by examiner

FIG. 5

| FREQUENT MESSAGE | PATH | ID |
|---|---|---|
| file not find | /var/log/nova/nova-api.log | A |
| nova error | /var/log/nova/nova-compute.log | D |
| ... | ... | ... |

49 — 400A, 400B (NOVA1, NOVA2)

| FREQUENT MESSAGE | PATH | ID |
|---|---|---|
| neutron error | /var/log/neutron/server.log | B |
| file not find | /var/log/neutron/server.log | C |
| ... | ... | ... |

49 — 400C (NEUTRON1)

| PATH | MESSAGE | NUMBER OF APPEARANCES |
|---|---|---|
| /var/log/nova/nova-api.log | file not find | 100 |
| /var/log/neutron/server.log | neutron error | 100 |
| /var/log/neutron/server.log | file not find | 100 |
| /var/log/nova/nova-compute.log | nova error | 100 |
| /var/log/nova/nova-api.log | can't access | 88 |
| ⋮ | ⋮ | ⋮ |

57

| FREQUENT MESSAGE | PATH | ID |
|---|---|---|
| file not find | /var/log/nova/nova-api.log | A |
| neutron error | /var/log/neutron/server.log | B |
| file not find | /var/log/neutron/server.log | C |
| nova error | /var/log/nova/nova-compute.log | D |
| ⋮ | ⋮ | ⋮ |

58

| PATH | ID |
|---|---|
| /var/log/nova/nova-compute.log | NOVA1 |
| /var/log/nova/nova-compute.log | NOVA2 |
| /var/log/neutron/server.log | NEUTRON1 |
| /var/log/nova/nova-api.log | NOVA1 |
| /var/log/nova/nova-api.log | NOVA2 |
| /var/log/nova/nova-api.log | NOVA3 |
| /var/log/nova/nova-compute.log | NOVA3 |
| ⋮ | ⋮ |

INFORMATION PROCESSING APPARATUS AND INFORMATION PROCESSING SYSTEM

CROSS-REFERENCE TO RELATED APPLICATION

This application is based upon and claims the benefit of priority of the prior Japanese Patent Application No. 2017-238012, filed on Dec. 12, 2017, the entire contents of which are incorporated herein by reference.

FIELD

The embodiments discussed herein are related to an information processing apparatus and an information processing system.

BACKGROUND

When transmitting a log generated with the operation of an information processing apparatus to a log management apparatus via a network, a load is imposed on the network. In order to reduce the load on the network, there has been proposed a method of converting a predetermined character string included in a log into character string information shorter than the character string, and then transmitting the character string information to a management apparatus. There has also been proposed a method of reducing the amount of use of a storage area storing log data by replacing a character string appearing plural times with a unique number in plural pieces of log data that is output as a result of plural simulations by a computer.

Related techniques are disclosed in, for example, Japanese Laid-open Patent Publication No. 2013-025744, Japanese Laid-open Patent Publication No. 2014-016758, and Japanese Laid-open Patent Publication No. 2008-210073.

SUMMARY

According to an aspect of the present invention, provided is an information processing apparatus including a first memory, a second memory, and a processor coupled to the first and second memories. The processor is configured to receive a first log from a first transmission apparatus of one or more log transmission apparatuses. The processor is configured to determine target log information among plural pieces of log information included in the first log. The target log information is one of first pieces among the plural pieces of log information. The first pieces of log information have an occurrence frequency higher than an occurrence frequency of other pieces among the plural pieces of log information. The processor is configured to assign an identifier to the target log information. The identifier identifies the target log information. The processor is configured to store log management information indicating a correspondence among the target log information, the identifier, and a first path in the second memory. The first path is received together with the first log and indicates a storage location in which the first log is stored. The processor is configured to transmit the log management information to a second log transmission apparatus among the one or more log transmission apparatuses. The second log transmission apparatus corresponds to the first path. The processor is configured to receive, from the second log transmission apparatus, a log in which the target log information is converted into the identifier based on the log management information.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 5 is a view illustrating an example of a frequent message extraction table of a processing server illustrated in FIG. 3;

FIG. 6 is a view illustrating an example of a statistics table, a frequent message management table, and a corresponding host management table of a management server illustrated in FIG. 3;

DESCRIPTION OF EMBODIMENTS

The types of messages such as character strings included in a log and the occurrence frequency of messages differ according to the type of a service that is the generation source of logs. For this reason, when a message to be replaced with a predetermined character string among plural messages included in logs output by plural types of services is commonly determined by the plural types of services, there is a possibility that the logs may be compressed inefficiently depending on the services. When the logs are compressed inefficiently, the load on a communication path through which the logs are transmitted may be insufficiently reduced.

Hereinafter, embodiments will be described with reference to the accompanying drawings.

Figure 1:
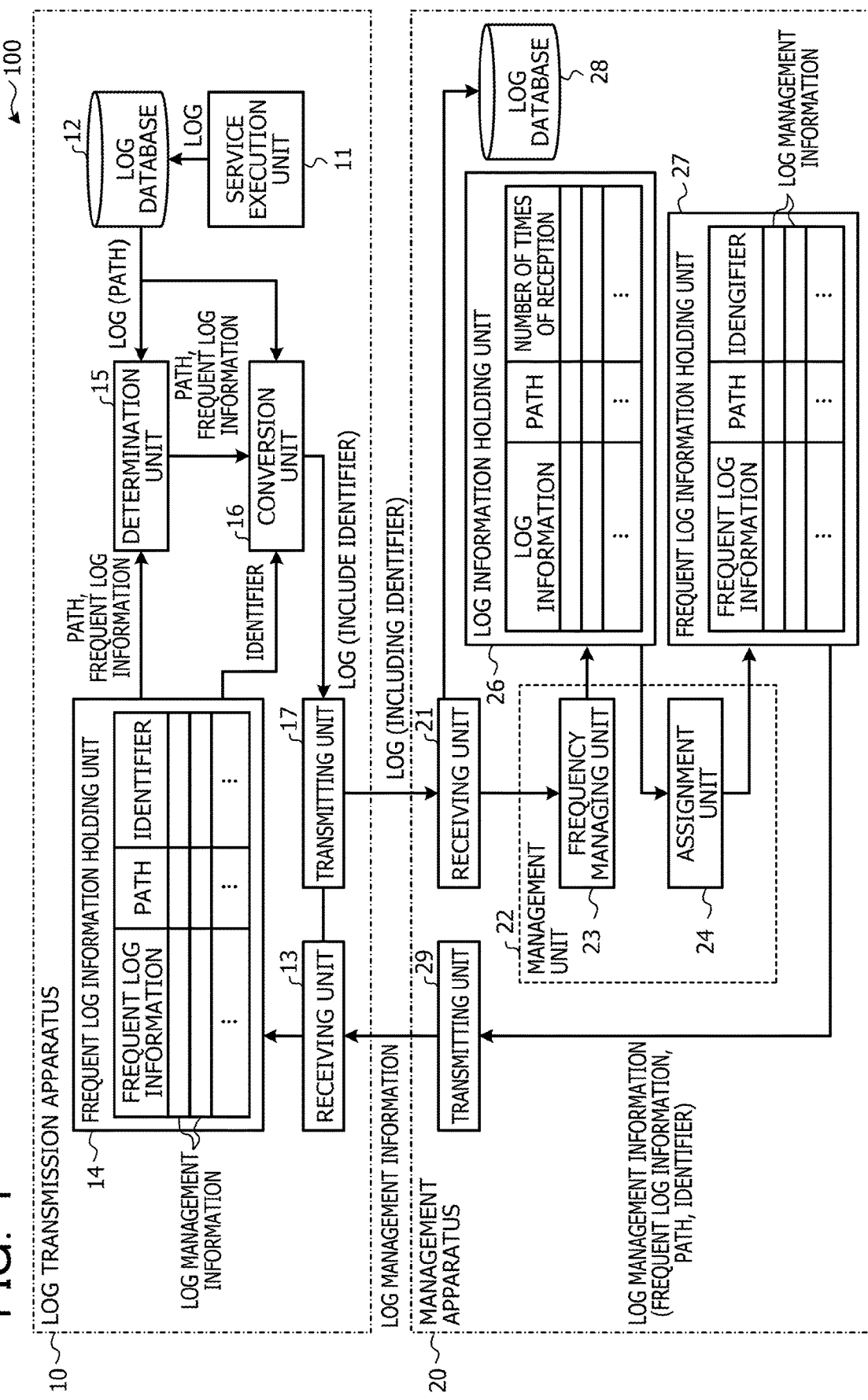
FIG. 1 is a view illustrating an information processing system according to a first embodiment.

FIG. 1 illustrates an information processing system according to a first embodiment. The information processing system 100 illustrated in FIG. 1 includes a log transmission apparatus 10 and a management apparatus 20 that manages the log transmission apparatus 10. The log transmission apparatus 10 is an example of a first information processing apparatus and the management apparatus 20 is an example of a second information processing apparatus. In FIG. 1, one log transmission apparatus 10 is connected to the management apparatus 20, but plural log transmission apparatuses 10 may be connected to the management apparatus 20 and the management apparatus 20 may manage the plural log transmission apparatuses 10. Further, the log transmission apparatus 10 and the management apparatus 20 may be connected with each other via a network.

The log transmission apparatus 10 includes a service execution unit 11, a log database 12, a receiving unit 13, a frequent log information holding unit 14, a determination unit 15, a conversion unit 16, and a transmitting unit 17. The functions of the receiving unit 13, the determination unit 15, the conversion unit 16, and the transmitting unit 17 may be implemented by a processor such as a CPU (Central Processing Unit) included in the log transmission apparatus 10 to execute a program stored in a memory or the like of the log transmission apparatus 10. The functions of the receiving unit 13, the determination unit 15, the conversion unit 16, and the transmitting unit 17 may be implemented by hardware such as an FPGA (Field-Programmable Gate Array) included in the log transmission apparatus 10.

The service execution unit 11 executes various services based on an instruction from a terminal device (not illustrated) operated by a user or the like, and stores plural logs indicating service execution histories (e.g., events, errors, etc.) in a predetermined storage location of the log database 12. The service execution unit 11 is an example of a log generation source. For example, the service execution unit 11 is used to implement a cloud service, a micro service, or the like.

Although not particularly limited, each log includes time information indicating the occurrence date/time of various events occurring with execution of a service, and plural pieces of log information indicating an execution history and the like. A log generated for each service by the service execution unit 11 is stored as a log file in a storage location allocated to the log database 12 for each service. For example, the storage location in which the log file is stored is indicated by a path as described in FIG. 4.

For example, the service execution unit 11 is implemented by a virtual machine that virtualizes physical resources including a processor such as a CPU (not illustrated), a memory device such as a memory (not illustrated), a storage device such as a HDD (Hard Disk Drive) (not illustrated), and the like of the log transmission apparatus 10. The service execution unit 11 may be implemented by physical resources. Further, the service execution unit 11 and the log database 12 may be installed in another information processing apparatus arranged outside the log transmission apparatus 10.

The receiving unit 13 receives log management information from the management apparatus 20, and stores the received log management information in the frequent log information holding unit 14. The log management information includes frequent log information that is more frequently generated than other log information among the plural pieces of log information included in the log, a path that indicates a storage location in which the log that includes the frequent log information is stored, and an identifier that identifies the frequent log information. The identifier is, for example, a character string or a numeric string, and the information amount (size of data) thereof is smaller than the information amount of the frequent log information.

The frequent log information holding unit 14 has plural records (row areas) including an area where frequent log information, a path, and an identifier are stored. As will be described later, the frequent log information is detected by the management apparatus 20, and the identifier is assigned by the management apparatus 20 in association with the detected frequent log information.

The determination unit 15 refers to the log management information held in the frequent log information holding unit 14 to determine for each path (i.e., for each service) whether the log information included in the log stored in the log database 12 matches the frequent log information. When the determination unit 15 determines that a combination of the log information included in the log and the path indicating the storage location, in which the log is stored, matches a combination of the frequent log information held in the frequent log information holding unit 14 and the path, the determination unit 15 notifies the conversion unit 16 of the matched frequent log information and path. The determination unit 15 may notify the conversion unit 16 of the position of a record in the frequent log information holding unit 14 that holds the frequent log information matching the log information.

Based on the notification from the determination unit 15, the conversion unit 16 acquires the identifier held in the frequent log information holding unit 14 in association with the combination of the frequent log information and the path notified from the determination unit 15. Then, the conversion unit 16 converts the frequent log information notified from the determination unit 15 into the acquired identifier to generate a log in which the frequent log information is converted into the identifier.

The transmitting unit 17 transmits the log including the identifier converted by the conversion unit 16 to the management apparatus 20. When the determination unit 15 determines that the log information included in the log stored in the log database 12 does not match the frequent log information, the log stored in the log database 12 is transmitted to the management apparatus 20 without being converted by the conversion unit 16. Further, the transmitting unit 17 transmits, to the management apparatus 20, the information on the path indicating the storage location, in which the log is stored, in the log database 12 in which the log to be transmitted is stored, and the apparatus information identifying the log transmission apparatus 10, together with the log.

As described above, since the information amount of the identifier is smaller than the information amount of the frequent log information, the transfer amount of the log from the log transmission apparatus 10 to the management apparatus 20 may be further reduced as compared with a case where the frequent log information is not converted into the identifier. As a result, it is possible to reduce the load on a communication path through which the log is transmitted. Further, the transmitting unit 17 may compress plural logs output from the log database 12 via the conversion unit 16, and then transmit the compressed logs to the management apparatus 20. In this case, the management apparatus 20 has a function of decompressing the compressed logs.

The management apparatus 20 includes a receiving unit 21, a managing unit 22, a log information holding unit 26, a frequent log information holding unit 27, a log database 28, and a transmitting unit 29. The managing unit 22 includes a frequency managing unit 23 and an assignment unit 24. The managing unit 22 manages log management information indicating the correspondence among frequent log information, an identifier, and a path indicating a log storage location allocated for each log generation source (in the log database 12).

The functions of the receiving unit 21, the managing unit 22, and the transmitting unit 29 are implemented by a processor such as a CPU of the management apparatus 20 to execute a program stored in a memory or the like of the management apparatus 20. The functions of the receiving unit 21, the managing unit 22, and the transmitting unit 29 may be implemented by hardware such as an FPGA included in the management apparatus 20.

The receiving unit 21 receives a log transmitted from the log transmission apparatus 10, stores the received log in the log database 28, and transfers the received log to the frequency managing unit 23. The identifier included in the log stored in the log database 28 is converted into the original frequent log information, for example, by referring to the frequent log information holding unit 27. Before the log received by the receiving unit 21 is stored in the log database 28, the identifier included in the received log may be converted into frequent log information. The log stored in the log database 28 is used for log analysis and the like.

The frequency managing unit 23 stores each of the plural pieces of log information included in the log transferred from the receiving unit 21 and a path indicating a storage location, in which the log is stored, in the log database 12 in the log information holding unit 26. Further, the frequency managing unit 23 stores the number of times of reception from the log transmission apparatus 10 for each combination of log information and path in the log information holding unit 26. For example, the log information holding unit 26 has plural records including an area where log information, a path, and the number of times of reception are stored. The log information holding unit 26 is an example of a storage unit, and a record is an example of a storage area.

The assignment unit 24 determines log information indicating that the number of times of reception held in the log information holding unit 26 has reached a predetermined threshold value (e.g., 100 times), as frequent log information, and assigns an identifier to the determined frequent log information. The assignment unit 24 stores the assigned identifier in a vacant record of the frequent log information holding unit 27 together with a combination of the frequent log information and the path. That is, the assignment unit 24 stores log management information including the frequent log information, the path, and the identifier in the frequent log information holding unit 27. The frequent log information holding unit 27 has plural records including an area where the log management information is stored. The frequent log information holding unit 27 is an example of a storage unit. Instead of the log information holding unit 26 and the frequent log information holding unit 27, one information holding unit may be installed in the management apparatus 20. In this case, the information holding unit is installed, for example, by adding an area that stores an identifier in each record of the log information holding unit 26.

The transmitting unit 29 transmits the log management information stored in the frequent log information holding unit 27 to the log transmission apparatus 10. For example, the transmitting unit 29 transmits the log management information stored in the frequent log information holding unit 27 to the log transmission apparatus 10 each time the log management information is stored in the frequent log information holding unit 27 by the assignment unit 24. In other words, each time an identifier is assigned by the assignment unit 24, the transmitting unit 29 transmits the log management information including the assigned identifier to the log transmission apparatus 10. This makes it possible to promptly transmit, to the log transmission apparatus 10, the log management information including the frequent log information for each path detected by the management apparatus 20 and the identifier assigned corresponding to the frequent log information. As a result, based on the detection of frequent log information by the management apparatus 20, the log transmission apparatus 10 may promptly start a process of converting the frequent log information into an identifier.

By installing the frequent log information holding unit 27 that holds the log management information including an identifier separately from the log information holding unit 26 that holds the number of times of reception of log information, the transmitting unit 29 may access only the frequent log information holding unit 27 to acquire the log management information including the identifier. In other words, the transmitting unit 29 may acquire the log management information including a frequent log, a path, and an identifier only with an access to the corresponding record of the frequent log information holding unit 27.

Figure 2:
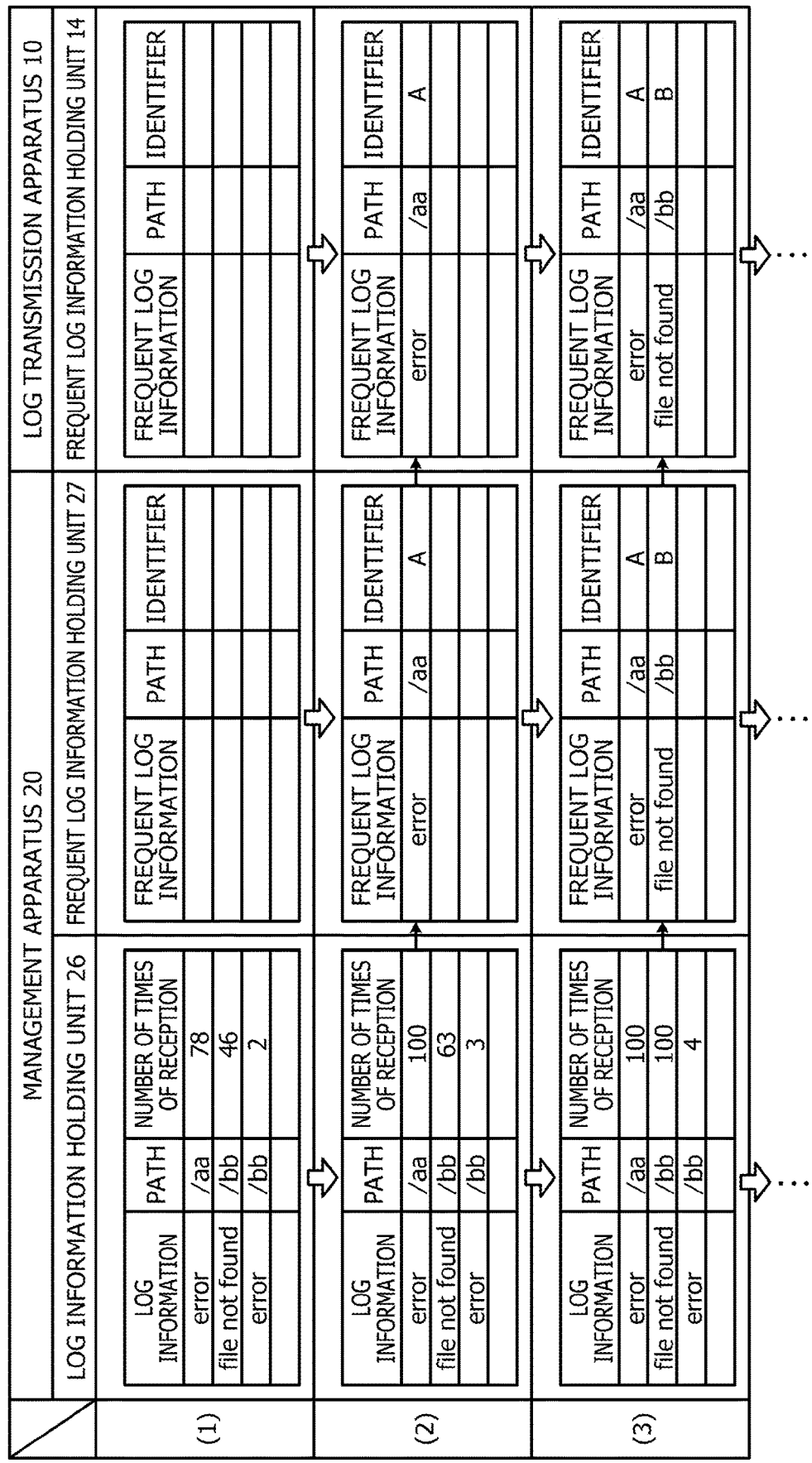
FIG. 2 is a view illustrating an example of an operation of the information processing system illustrated in FIG. 1.

FIG. 2 illustrates an example of the operation of the information processing system 100 illustrated in FIG. 1. Although not particularly limited, it is assumed that, when log information and a path of the same combination are received 100 times as a predetermined threshold value, the assignment unit 24 detects the received log information as frequent log information.

Every time a log from the log transmission apparatus 10 is received, the frequency managing unit 23 stores a combination of log information and a path included in the received log in the log information holding unit 26 together with the number of times of reception.

In a state (1), log information "error" contained in the log and a path "/aa" indicating a storage location, in which the log including the log information "error" is stored, are held in the log information holding unit 26. The number of times of reception of a combination of the log information "error" and the path "/aa" is 78. In addition, log information "file not found" included in the log and a path "/bb" indicating a storage location, in which the log including the log information "file not found" is stored, are held in the log information holding unit 26. The number of times of reception of a combination of the log information "file not found" and the path "/bb" is 46.

Furthermore, the log information "error" included in the log and the path "/bb" indicating the storage location, in which the log including the log information "error" is stored, are held in the log information holding unit 26. The number of times of reception of a combination of the log information "error" and the path "/bb" is two.

As illustrated in the state (1), when paths for the same log information "error" are different, the number of times of reception may differ. This is because when the contents of the service differ, the contents of the output log and the occurrence frequency of the log information are different. Therefore, even when the log information is the same to each other, the managing unit 22 separately controls the number of times of reception for each path when the paths indicating the storage locations of the logs including the log information are different. The log information such as "error" is a character string (text data).

In the state (1), a combination of log information and a path having the number of times of reception of 100 or more does not exist in the log information holding unit 26. Therefore, the assignment unit 24 does not detect frequent log information, and the frequent log information holding units 27 and 14 are empty.

In a state (2), based on the fact that the number of times of reception of the combination of the log information "error" and the path "/aa" held in the log information holding unit 26 has reached 100, the assignment unit 24 sets the log information "error" corresponding to the path "/aa" as frequent log information. The assignment unit 24 assigns an identifier "A" to the frequent log information "error" corresponding to the path "/aa". For example, the identifier "A" is a character string "A". The assignment unit 24 stores the assigned identifier "A", together with the combination of the frequent log information "error" and the path "/aa", in the frequent log information holding unit 27 as log management information.

The transmitting unit 29 transmits the log management information stored in the frequent log information holding unit 27 to the log transmission apparatus 10. For example, the assignment unit 24 notifies the transmitting unit 29 of information indicating a record of the frequent log information holding unit 27 that stores the log management information. The transmitting unit 29 transmits the log management information stored in the record notified from the assignment unit 24 to the log transmission apparatus 10. Thus, each time the log management information is stored in the frequent log information holding unit 27, the log management information stored in the frequent log information holding unit 27 may be transmitted to the log transmission apparatus 10. Further, based on an actual log received from the log transmission apparatus 10, the management apparatus 20 may dynamically update the log information storage unit 26 and frequent log information storage unit 27 that manage frequent log information. That is, it is possible to automatically update the frequent log information without manual intervention.

The receiving unit 13 of the log transmission apparatus 10 stores the received log management information in the frequent log information holding unit 14. Then, based on the log management information held in the frequent log information holding unit 14, the log transmission apparatus 10 converts log information included in the log into an identifier and transmits a log including the converted identifier to the management apparatus 20.

For example, the determination unit 15 refers to the frequent log information holding unit 14 to determine whether the frequent log information "error" exists in plural pieces of log information included in the log stored in the storage location indicated by the path "/aa". Then, when it is determined that the frequent log information "error" exists, the determination unit 15 notifies the conversion unit 16 of the frequent log information "error" together with the path "/aa" to instruct replacement of the frequent log information "error" with an identifier. Based on the instruction from the determination unit 15, the conversion unit 16 converts the log information "error" determined to be frequent log information into the identifier "A".

Then, the transmitting unit 17 transmits, to the management apparatus 20, the log in which the log information "error" is converted into the identifier "A" by the conversion unit 16. Therefore, after the frequent log information "error" is stored in the frequent log information holding unit 14 of the log transmission apparatus 10, the management apparatus 20 receives the identifier "A" instead of the log information "error" included in the log corresponding to the path "/aa". Thereafter, since the frequency managing unit 23 does not receive the log information "error" included in the log corresponding to the path "/aa", the number of times of reception of the combination of the log information "error" and the path "/a" in the log information holding unit 26 does not increase.

Since the managing unit 22 recognizes the identifier assigned by the assignment unit 24, the frequency managing unit 23 does not treat the identifier "A" included in the log of the path "/aa", for example, as log information. Therefore, since the identifier "A" is not treated as log information, the number of times of reception of the identifier "A" is not stored in the log information holding unit 26. Therefore, a number of identifiers "A" to be received afterwards are not determined as the frequent log information.

In the meantime, for example, the determination unit 15 has already detected that frequent log information corresponding to the path "/bb" does not exist in the frequent log information holding unit 14 by referring to the frequent log information holding unit 14 in advance. Therefore, the determination unit 15 does not search the frequent log information holding unit 14 with respect to the log stored in the storage location indicated by the path "/bb", and does not execute a log information determining operation. That is, the determination unit 15 does not instruct the conversion unit 16 to replace frequent log information with an identifier.

In this way, by holding the frequent log information and the identifier as the log management information for each path in the frequent log information holding unit 14, it is possible to lower the search frequency of the frequent log information holding unit 14 by the determination unit 15, as compared with a case where the frequent log information is not managed for each path. Therefore, it is possible to reduce an overhead of the determination unit 15, as compared with a case where the frequent log information is not managed for each path.

Since there is no instruction from the determination unit 15, the conversion unit 16 does not execute the operation of converting the log information stored in the storage location indicated by the path "/bb" into an identifier, and transfers a log read from the log database 12 to the transmitting unit 17. In the meantime, when the frequent log information is not managed for each path and a combination of frequent log information and an identifier is commonly set for plural services, the conversion unit 16 executes the operation of converting the log information stored in the storage location indicated by the path "/bb" into an identifier. Therefore, in FIG. 2, as compared with a case where the frequent log information is not managed for each path, it is possible to reduce the conversion frequency of the log information into the identifier by the conversion unit 16, thereby making it possible to reduce the overhead of the conversion unit 16. As a result, the overhead of the log transmission apparatus 10 may be reduced. In addition, the log transmission apparatus 10 uses the log management information set by the management apparatus 20 based on an actual log to convert the frequent log information included in the log into an identifier. Therefore, the log may be efficiently compressed as compared with a case where the frequent log information is predicted to be handled by the hand of a person or the like.

In the meantime, for example, it is assumed that the managing unit 22 counts the number of times of reception of log information without distinguishing between paths (services). In this case, not only the log information "error" corresponding to the path "/aa" but also the log information "error" corresponding to the path "/bb" is also determined as frequent log information. The management apparatus 20 transmits the frequent log information "error" to the log transmission apparatus 10 together with the identifier "A" without associating the frequent log information "error" with the path "/aa".

In this case, the determination unit 15 executes not only the search of the frequent log information holding unit 14 for the log information "error" in the log of the path "/aa" but also the search of the frequent log information holding unit 14 for the log information "error" in the log of the path "/bb". Then, the determination unit 15 determines not only the log information "error" in the log held in the path "/aa" but also the log information "error" in the log held in the path "/bb" as frequent log information. Therefore, an overhead of searching of the frequent log information holding unit 14 by the determination unit 15 occurs.

In addition, the conversion unit 16 converts not only the log information "error" in the log held in the path "/aa" but also the log information "error" in the log held in the path "/bb" into an identifier. Since the log information "error" of the path "/bb" which is not originally frequent log information is converted into an identifier, the overhead of the conversion unit 16 occurs. Further, for example, in the state (2), the number of times of reception of the log information "error" corresponding to the path "/bb" is 3, which is not the true frequent log information. Therefore, when the frequent log information is not managed for each path, the accuracy of extraction of the true frequent log information is reduced.

In a state (3), the assignment unit 24 detects that the number of times of reception of a combination of the log information "file not found" and the path "/bb" held in the log information holding unit 26 has reached 100. The assignment unit 24 determines the log information "file not found" corresponding to the path "/bb" as frequent log information. The assignment unit 24 assigns an identifier "B" to the frequent log information "file not found" corresponding to the path "/bb". For example, the identifier "B" is a character string "B". The assignment unit 24 stores the assigned identifier "B", together with the combination of the frequent log information "file not found" and the path "/bb" in the frequent log information holding unit 27 as log management information. The transmitting unit 29 transmits the log management information stored in the frequent log information holding unit 27 to the log transmission apparatus 10, and the log transmission apparatus 10 stores the received log management information in the frequent log information holding unit 14. Then, based on the log management information stored in the frequent log information holding unit 14, the log transmission apparatus 10 converts the log information included in the log into an identifier, and transmits the log including the identifier to the management apparatus 20.

For example, the determination unit 15 searches only a record that holds the path "/aa in the frequent log information holding unit 14 and determines whether the frequent log information "error" exists among plural pieces of log information included in the log stored in the storage location indicated by the path "/aa". As in the state (2), since there is no need to search a record that holds the path "/bb", the efficiency of search of the frequent log information holding unit 14 by the determination unit 15 may be improved as compared with a case where the frequent log information is not managed for each path.

In addition, by managing the frequent log information for each path, the frequent log information may be determined based on the number of times of reception for each path even when the number of times of reception of log information of interest differs depending on the path. This makes it possible to improve the accuracy of extraction of the true frequent log information, as compared with a case where the frequent log information is not managed for each path.

As described above, in the first embodiment illustrated in FIGS. 1 and 2, since the frequent log information is managed for each path, when the frequent log information included in the log is searched from the frequent log information holding unit 14, it is sufficient to search only a record including a path corresponding to the log. Therefore, as compared with a case where the frequent log information is not managed for each path, it is possible to improve the search efficiency of frequent log information by the determination unit 15 and lower the search frequency of the frequent log information holding unit 14 by the determination unit 15. In addition, it is possible to lower the conversion frequency of log information into an identifier by the conversion unit 16. That is, the overhead of the log transmission apparatus 10 may be reduced while reducing the load on a communication path through which the log is transmitted, as compared with a case where the frequent log information is not managed for each path.

It is possible to dynamically update the log information holding unit 26 and the frequent log information holding unit 27 that manage the frequent log information, based on an actual log received from the log transmission apparatus 10. That is, since the frequent log information may be automatically updated without manual intervention, the log transmission apparatus 10 may compress the log more efficiently, as compared with a case where the frequent log information is set with an anticipation by the hand of a person, etc.

By managing the frequent log information for each path, the frequent log information may be determined based on the number of times of reception for each path even when the number of times of reception of log information of interest differs depending on the path. This makes it possible to improve the accuracy of extraction of the true frequent log information, as compared with a case where the frequent log information is not managed for each path.

Every time the log management information is stored in the frequent log information holding unit 27, by transmitting the log management information to the log transmission apparatus 10, the log management information including frequent log information and an identifier for each path may be quickly transmitted to the log transmission apparatus 10. As a result, the log transmission apparatus 10 may promptly start the process of converting frequent log information into an identifier based on detection of frequent log information by the management apparatus 20. By installing the frequent log information holding unit 27 separately from the log information holding unit 26, the transmitting unit 29 may acquire only the log management information including frequent log information, a path and an identifier only with an access to the corresponding record of the frequent log information holding unit 27.

Figure 3:
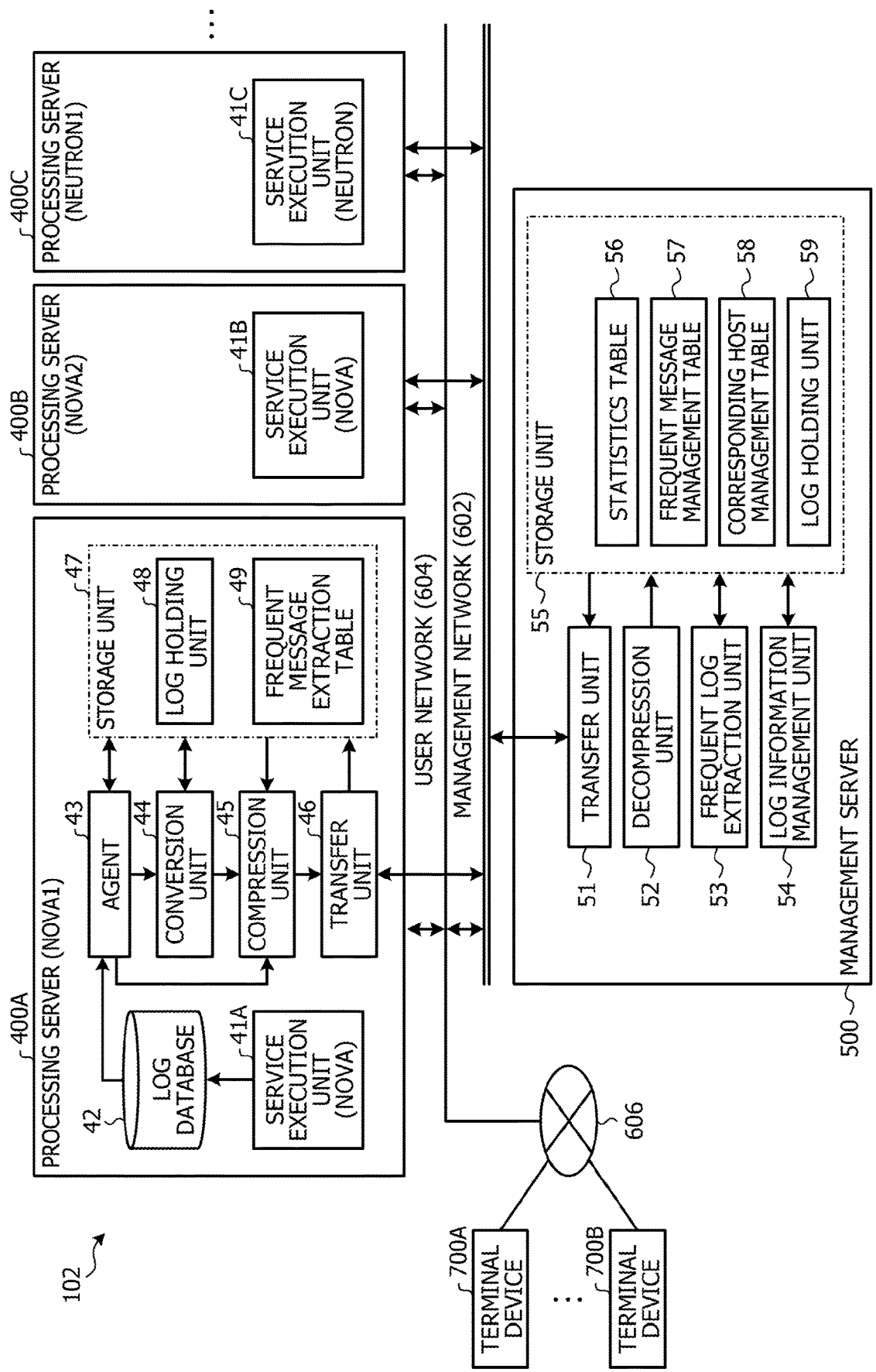
FIG. 3 is a view illustrating an information processing system according to a second embodiment.

FIG. 3 illustrates an information processing system according to a second embodiment. Detailed description of the same elements as those in FIGS. 1 and 2 will not be repeated. The information processing system 102 illustrated in FIG. 3 is used, for example, for a cloud service or a micro service that provides computer resources via a network. The information processing system 102 includes plural processing servers 400 (e.g., 400A, 400B, 400C) that execute information processing, and a management server 500 that manages the processing servers 400.

Figure 11:
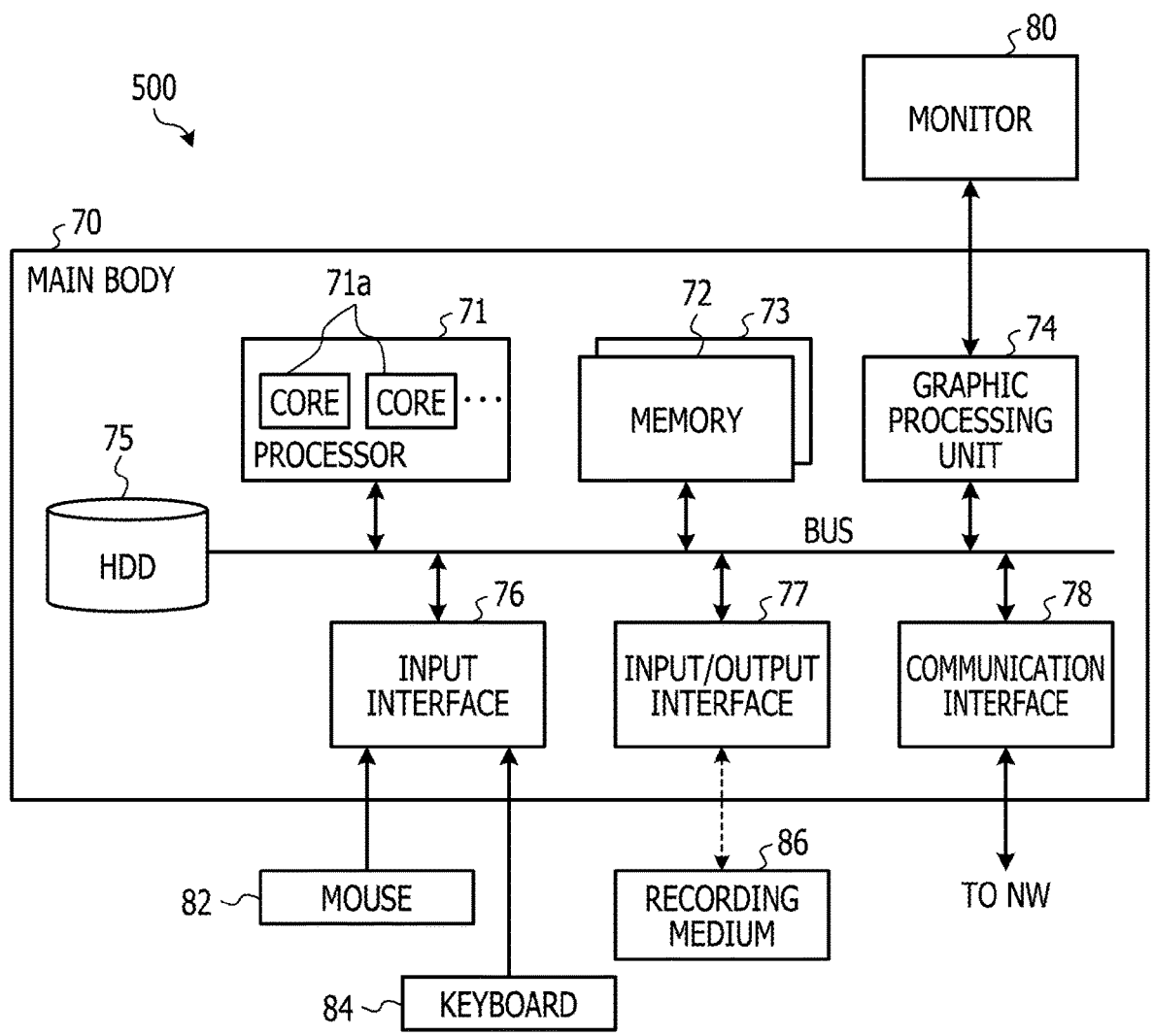
FIG. 11 is a view illustrating an example of a hardware configuration of the management apparatus illustrated in FIG. 1 and the management server illustrated in FIG. 3.

The processing server 400 and the management server 500 are interconnected via a management network 602. The processing server 400 is an example of a log transmission apparatus or a first information processing apparatus, and the management server 500 is an example of a management apparatus or a second information processing apparatus. An example of a hardware configuration of the processing server 400 and the management server 500 is illustrated in FIG. 11.

The processing server 400 and the management server 500 are connected to a network 606 such as the Internet or an intranet via a user network 604. A terminal device 700 (700A, 700B, etc.) operated by each user who uses the processing server 400 is connected to the network 606.

The network 606 may be connected to the management server 500 not via the user network 604 and an instruction from the terminal device 700 may be transmitted to each processing server 400 via the management server 500. Further, when the same type of service is executed by plural processing servers 400, the information processing system 102 may have a load balancer that distributes instructions from the terminal device 700 to the plural processing servers 400. Since the processing servers 400 have the same or similar configuration, in the following description, the processing server 400A will be mainly described. In the following description, the processing server 400 is also referred to as a host.

The processing server 400A includes a service execution unit 41A, a log database 42, an agent 43, a conversion unit 44, a compression unit 45, a transfer unit 46, and a storage unit 47. The storage unit 47 has a log holding unit 48 and a frequent message extraction table 49. An example of the frequent message extraction table 49 is illustrated in FIG. 5. The storage unit 47 has a storage device such as, for example, a memory module including plural SDRAMs (Synchronous Dynamic Random Access Memory), a HDD, or an SSD (Solid State Drive).

Figure 9:
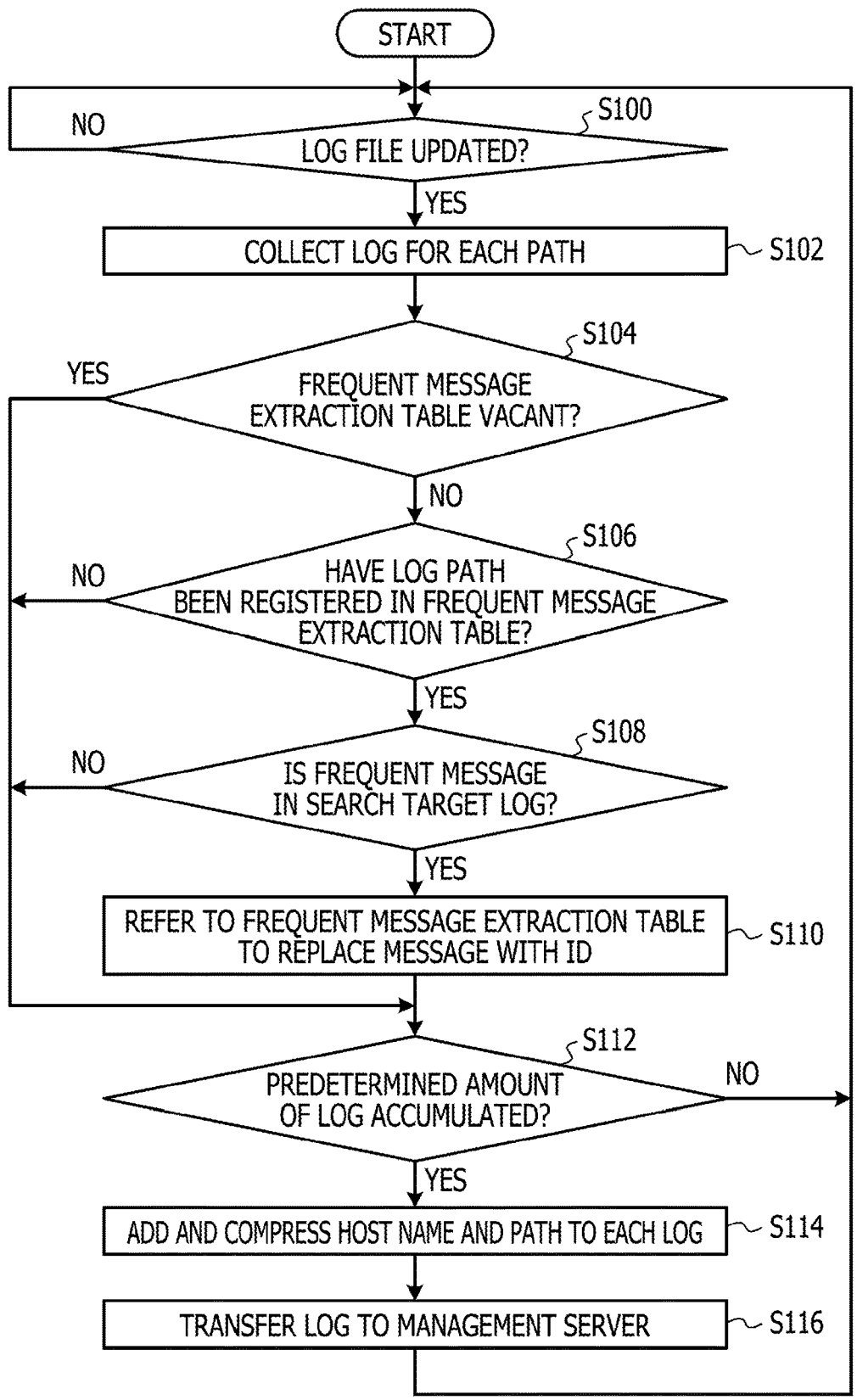
FIG. 9 is a view illustrating an example of an operation of the processing server illustrated in FIG. 3.

For example, the functions of the agent 43, the conversion unit 44, the compression unit 45, and the transfer unit 46 are implemented by a processor such as a CPU of the processing server 400A to execute a program stored in the storage unit 47 or the like. The functions of the agent 43, the conversion unit 44, the compression unit 45, and the transfer unit 46 may be implemented by hardware such as an FPGA included in the processing server 400A. An example of an operation of the processing server 400 is illustrated in FIG. 9.

Each of the service execution units 41 (41A, 41B, 41C) executes a predetermined number of various services based on an instruction from a user that operates the terminal device 700. For example, the service execution unit 41 is implemented by a virtual machine operating on the processing server 400. That is, the service execution unit 41 is implemented by software such as a hypervisor by using physical resources such as a CPU, a memory, a storage, and the like of the processing server 400A. Further, the service execution unit 41 may be implemented by using physical resources.

The service execution units 41A and 41B execute the same service NOVA in a distributed manner, and the service execution unit 41C executes a service NEUTRON different from the service NOVA. The processing servers 400A and 400B that execute the service NOVA are managed as hosts NOVA1 and NOVA2 by the management server 500. That is, the host names having only the last numbers different from each other indicate the processing servers 400 that execute the same services. The processing server 400C that executes the service NEUTRON is managed as a host NEUTRON1 by the management server 500.

For example, when the processing load of the service NOVA increases and a processing server 400 that executes the service NOVA is added (scaled-out), the added processing server 400 is managed as a host NOVA3 by the management server 500. In the meantime, when the processing load of the service NOVA decreases, a processing server 400 executing the service NOVA may be reduced (scaled-in).

The log database 42 holds, for each service, a log output by the service execution unit 41A that corresponds to each of plural types of services executed by the service execution unit 41A. The processing server 400A may have plural service execution units 41A that execute different services. Even in this case, the log database 42 holds, for each service, the logs output by the plural service execution units 41A. In the log database 42, a storage location that holds a log is allocated for each service, and each storage location is managed by a path as described in FIG. 4. The log database 42 may be stored in the storage unit 47.

The agent 43 collects the logs stored in the log database 42 separately for each path, and stores the collected logs in the log holding unit 48. Based on the information held in the frequent message extraction table 49, the agent 43 determines whether there is a frequent message whose appearance frequency is higher than the other messages among the messages included in the log stored in the log holding unit 48. At this time, the agent 43 determines a frequent message for each service executed by the service execution unit 41A (i.e., for each path), based on the information held in the frequent message extraction table 49. That is, the agent 43 collects logs for each path indicating the storage location of in which the log is stored, and determines whether a message included in the log matches a frequent message for each path held in the frequent message extraction table 49. The agent 43 that determines whether a message is a frequent message is an example of a determination unit. The message included in the log is an example of log information, and the frequent message is an example of frequent log information.

When a frequent message is detected in the log, the agent 43 issues an instruction to convert the frequent message included in the log into an ID (Identification) to the conversion unit 44. The ID is an example of an identifier that identifies the frequent message. The ID is, for example, a character string or a numeric string, and the value thereof smaller than the information amount of the frequent message is selected.

The conversion unit 44 reads a log including the frequent message from the log holding unit 48 based on the instruction from the agent 43, and converts the frequent message included in the read log into an ID based on the information held in the frequent message extraction table 49. For example, the conversion unit 44 rewrites the log in which the frequent message is replaced with the ID, in the log holding unit 48.

When executing the process of detecting a frequent message with respect to a predetermined amount of logs, the agent 43 issues, to the compression unit 45, an instruction to compress a predetermined amount of log held in the log holding unit 48 together with a path indicating a host name of the processing server 400 and a storage location in which the log is stored. Based on the instruction from the agent 43, the compression unit 45 reads the predetermined amount of log held in the log holding unit 48, and compresses the read log after adding a host name and a path to the information included in the read log. The compression unit 45 outputs the compressed log to the transfer unit 46. For example, a compressing process is performed using a data compression algorithm such as a dictionary compression method.

The transfer unit 46 transmits the information including the log received from the compression unit 45 to the management server 500 via the management network 602. The transfer unit 46 that transmits the information including the compressed log to the management server 500 is an example of a transmitting unit. In the meantime, the transfer unit 46 stores the information received from the management server 500 via the management network 602 in the frequent message extraction table 49. The transfer unit 46 that receives the information from the management server 500 is an example of a receiving unit.

The management server 500 includes a transfer unit 51, a decompression unit 52, a frequent log extraction unit 53, a log information management unit 54, and a storage unit 55. The storage unit 55 includes a statistics table 56, a frequent message management table 57, a corresponding host management table 58, and a log holding unit 59. The frequent log extraction unit 53 and the log information management unit 54 are examples of a management unit. Examples of the statistics table 56, the frequent message management table 57, and the corresponding host management table 58 are illustrated in FIG. 6.

Figure 10:
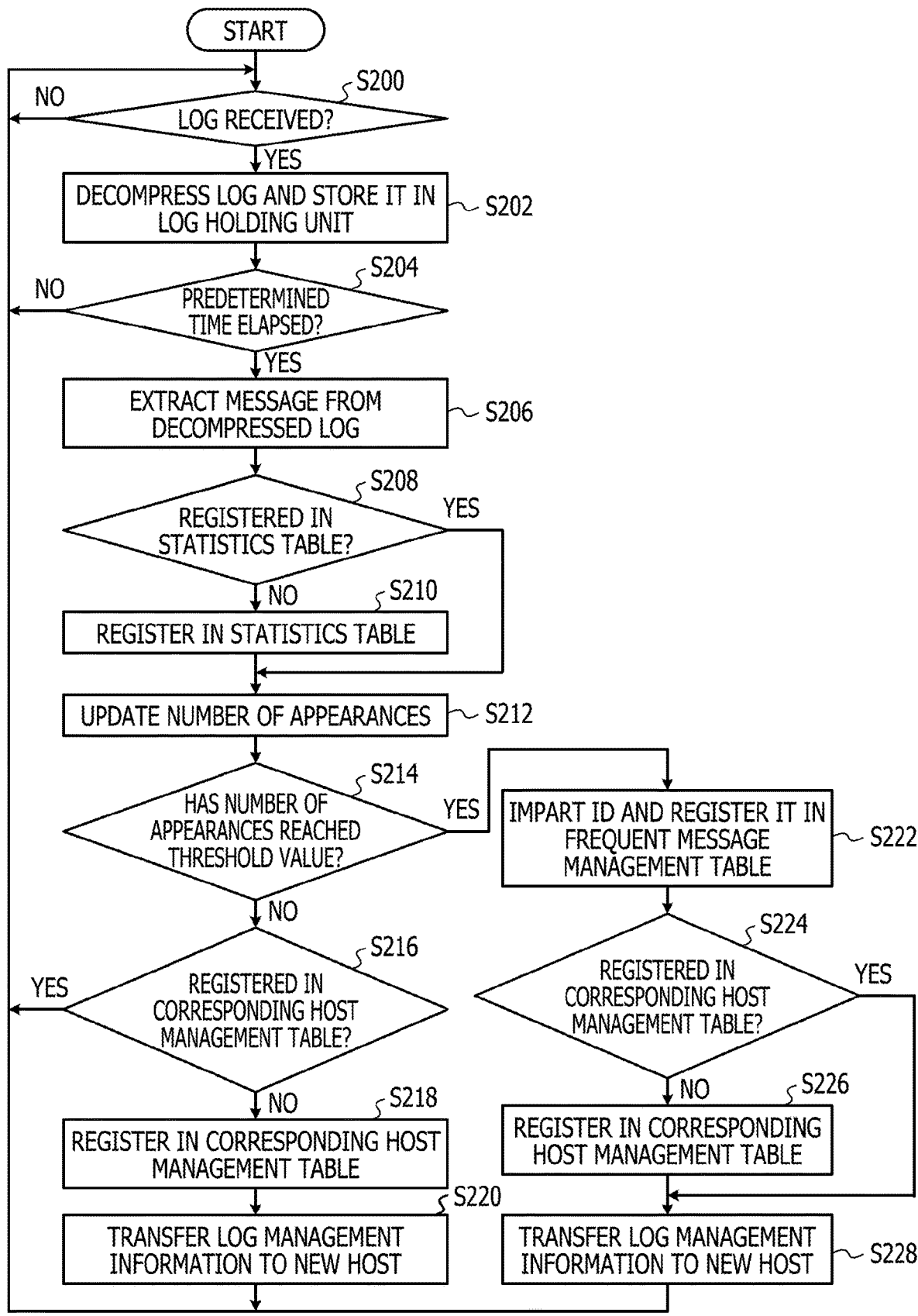
FIG. 10 is a view illustrating an example of an operation of the management server illustrated in FIG. 3.

The functions of the transfer unit 51, the decompression unit 52, the frequent log extraction unit 53, and the log information management unit 54 are implemented by a processor such as a CPU of the management server 500 to execute a program stored in the storage unit 55. The functions of the transfer unit 51, the decompression unit 52, the frequent log extraction unit 53, and the log information management unit 54 may be implemented by hardware such as an FPGA included in the management server 500. An example of an operation of the management server 500 is illustrated in FIG. 10.

The transfer unit 51 transfers the information including a log received from each processing server 400 via the management network 602 to the decompression unit 52. Further, the transfer unit 51 transmits the information held in the frequent message management table 57 to one of the processing servers 400 via the management network 602. The transfer unit 51 is an example of a receiving unit that receives a log from the processing server 400. In addition, the transfer unit 51 is an example of a transmitting unit that transmits log management information (to be described later) to the processing server 400. The decompression unit 52 decompresses the information including the log transferred from the transfer unit 51, and stores the decompressed log and a host name and a path added to the log in the log holding unit 59.

The frequent log extraction unit 53 searches the log decompressed by the decompression unit 52 for each path, extracts a message included in the logs for each path, and stores the extracted message in the statistics table 56 together with the path. In addition, the frequent log extraction unit 53 calculates the number of appearances, which is the number of times of extraction of message for each path, and stores the calculated number of appearances in the statistics table 56. The frequent log extraction unit 53 is an example of a frequency managing unit that manages the number of appearances of a message for each combination of a message and a path included in a log received from the processing server 400, and the number of appearances is an example of the number of times of reception.

The log information management unit 54 detects a message whose occurrence frequency is equal to or higher than a predetermined frequency among messages included in the log for each path stored in the statistics table 56 (i.e., a frequent message), based on the number of appearances. The log information management unit 54 assigns an ID to the frequent message and stores the assigned ID in the frequent message management table 57 together with the frequent message and the path. Hereinafter, a combination of the frequent message, the path, and the ID is also called log management information.

Further, every time the frequent message is stored in the frequent message management table 57, the log information management unit 54 issues, to the transfer unit, an instruction to transmit the log management information including the newly stored frequent message, a path, and an ID to all the processing servers 400 corresponding to the path. The log information management unit 54 that assigns an ID to a frequent message is an example of an assignment unit. The log information management unit 54 that issues an instruction to transfer the log management information including the detected frequent message to all the processing servers 400 corresponding to the path included in the log management information based on the detection of the frequent message is an example of a common information management unit.

Furthermore, the log information management unit 54 detects whether the combination of the path and the host name added to the log decompressed by the decompression unit 52 has already been registered in the corresponding host management table 58. When an unregistered combination of the path and the host name is added to the decompressed log in the corresponding host management table 58, the log information management unit 54 determines that a service has been started using a new host (processing server 400). Then, the log information management unit 54 registers a combination of the new host name and path in the corresponding host management table 58.

When the path newly registered in the corresponding host management table 58 is held in the frequent message management table 57, the log information management unit 54 extracts the corresponding log management information from the frequent message management table 57. Then, the log information management unit 54 issues, to the transfer unit 51, an instruction to transfer the extracted log management information to the processing server 400 corresponding to the host name newly registered together with the path in the corresponding host management table 58. The log information management unit 54 that detects a new combination of the path and the host name and issues an instruction to transmit the log management information including the corresponding path to the corresponding host is an example of a new management unit.

Figure 4:
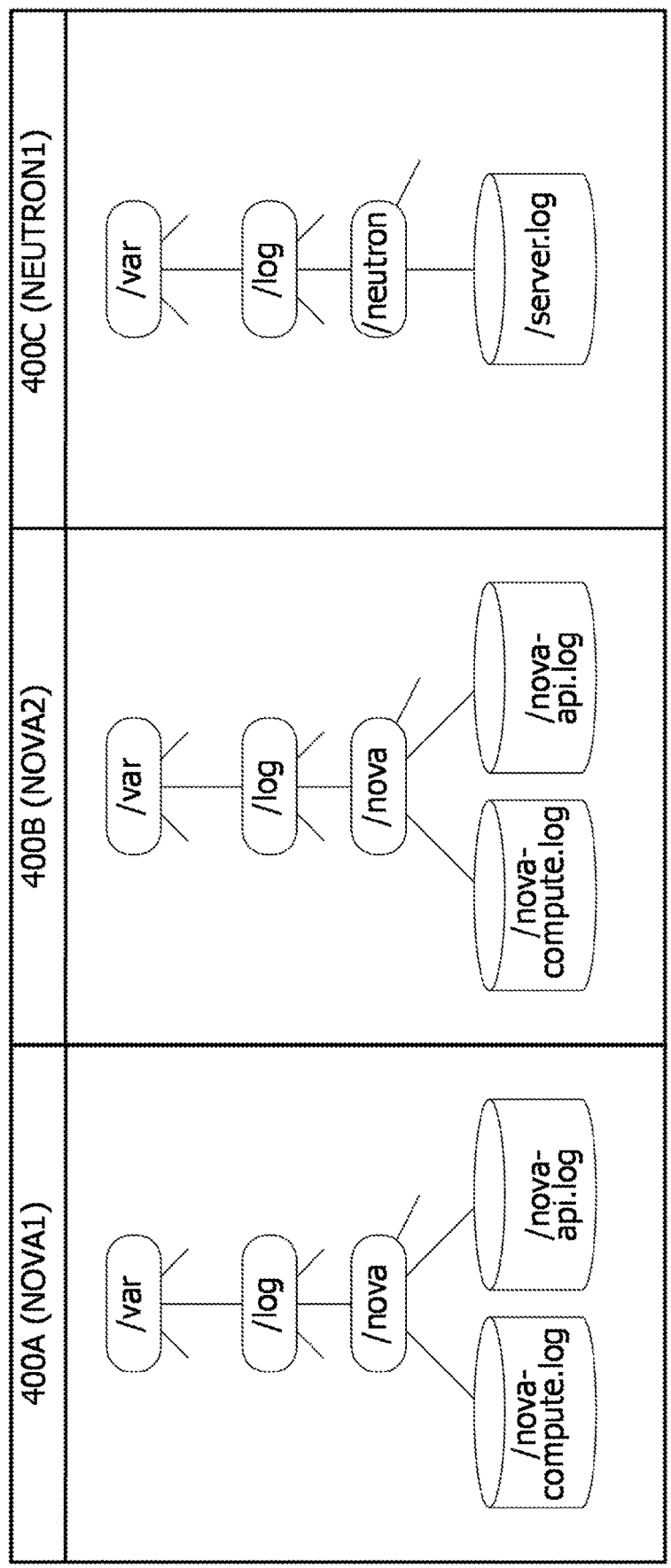
FIG. 4 is a view illustrating an example of a directory structure of a log file stored in a log database in each processing server illustrated in FIG. 3.

FIG. 4 illustrates an example of a directory structure of a log file stored in the log database 42 in each processing server 400 illustrated in FIG. 3. The processing servers 400A and 400B have a common directory structure. For example, two log files including the "nova-compute.log" and "nova-api.log" corresponding to two services are placed under the "/nova" directory. In the processing server 400C, for example, the log file of "sever.log" is placed under the "/neutron" directory.

In each of the processing servers 400A and 400B, the path of a storage location, in which the log file "nova-compute.log" is stored, is "/var/log/nova/nova-compute.log" and the path of a storage location, in which the log file "nova-api.log" is stored, is "/var/log/nova/nova-api.log". That is, a log indicating an execution history of the common service executed by each of the service execution unit 41A of the processing server 400A and the service execution unit 41B of the processing server 400B is stored in a storage location indicated by the common path in each of the processing servers 400A and 400B. That is, in each of the processing servers 400A and 400B that execute the same service, physical storage locations of the log are different from each other, but the paths indicating the storage locations are common to each other.

Therefore, even when a processing server 400 that executes a common service is added in a cloud service, a micro service, or the like, by using the fact that the paths are common, logs stored in physically different storage locations may be managed as a log for each service. In other words, even in a case where the processing server 400 executing the common service is added, logs stored in physically different storage locations may be managed as a log for each service without notifying the management server 500 of the addition of the processing server 400. Further, before and after the addition of the processing server 400, an operation flow of the management server 500 illustrated in FIG. 10 (to be described later) may be configured to be the same.

For example, it is assumed that the processing load of a service NOVA executed by the processing servers 400A and 400B (hosts NOVA1 and NOVA2) increases and a processing server 400D that executes the service NOVA is added. In this case, a directory structure of the added processing server 400 (e.g., the host NOVA3) is set to be the same as the directory structures of the processing servers 400A and 400B. That is, in the processing server 400D, the two log files of "nova-compute.log" and "nova-api.log" corresponding to two services are placed under "/nova" directory. The log file placed in each directory is not limited to the example illustrated in FIG. 4.

FIG. 5 illustrates an example of the frequent message extraction table 49 of the processing server 400 illustrated in FIG. 3. The log management information held in the frequent message extraction table 49 is common to each service. For example, the log management information held by the frequent message extraction table 49 of the processing servers 400A and 400B which execute the same service is the same. The frequent message extraction table 49 has plural records that store the log management information including a frequent message determined to be frequent among messages included in the log, a path indicating a storage location in which the log is stored, and an ID corresponding to the frequent message.

A frequent message among the messages included in the log in the two log files placed under the "/nova" directory (FIG. 4) is stored together with a path and an ID in the frequent message extraction table 49 of the processing servers 400A and 400B. The two log files are "nova-api.log" and "nova-compute.log". A frequent message among the messages included in the log in the log file placed under the/neutron directory ("server.log" in FIG. 4) is stored together with a path and an ID in the frequent message extraction table 49 of the processing server 400C.

When counting the number of appearances of a message without distinguishing between paths (services), the log management information common to different kinds of services executed by the plural processing servers 400 is stored in the frequent message extraction table 49. In the different kinds of services, for example, since the frequencies of outputting the message "file not found" differ from each other, the message may be a frequent message in some services, but it may be an infrequent message in other services. Therefore, when the frequencies of occurrence of the message differ for each service, it is difficult to reflect the message in the frequent message. As a result, since a message that is not originally a frequent message is replaced with an ID, an overhead of the agent 43 and the conversion unit 44 of the processing server 400 occurs.

In addition, when counting the number of appearances of a message without distinguishing between paths (services), the log management information corresponding to a frequent message that does not occur outside a specific service is transferred to a processing server 400 that executes another service. As a result, unnecessary log management information corresponding to a message that is not output at all is stored in the frequent message extraction table 49 of each processing server 400. Since the agent 43 searches not only useful log management information held in the frequent message extraction table 49 but also unnecessary log management information to determine a frequent message, the overhead of the agent 43 further increases.

FIG. 6 illustrates an example of the statistics table 56, the frequent message management table 57, and the corresponding host management table 58 of the management server 500 illustrated in FIG. 3.

The statistics table 56 has plural records that store a path indicating a storage location in which a log file including a log is stored, a message included in the log, and the number of appearances of the message. For example, all messages included in all the logs output by each service are stored in the statistics table 56. When a new message is stored in the statistics table 56 for each path, the number of appearances is set to "1". When a message included in a newly generated log is already stored in the statistics table 56, the number of appearances is increased by "1".

The frequent message management table 57 has plural records that store log management information including a frequent message included in the log, a path indicating a storage location in which a log file including a log is stored, and an ID to be replaced instead of the frequent message. For example, the information corresponding to a message whose number of appearances has reached a predetermined threshold value (e.g., 100) among the messages stored in the statistics table 56 is stored in the frequent message management table 57. In other words, a message whose number of appearances has reached the threshold value is treated as a frequent message whose occurrence frequency is equal to or greater than a predetermined frequency. In FIG. 6, the ID is indicated by the letters "A", "B", "C", and "D", but when it is smaller than the information amount of the message, the ID may be another character string or numeric string.

The statistics table 56 and the frequent message management table 57 are examples of a storage unit, and the records of the statistics table 56 and the frequent message management table 57 are examples of a storage area. Instead of the statistics table 56 and the frequent message management table 57, one table may be installed in the management server 500. In this case, for example, the table is installed by adding an area that stores an ID in each record of the statistics table 56, and the frequent message management table 57 is deleted.

The corresponding host management table 58 has plural records that store a path indicating a storage location in which a log file including a log is stored, and a host name identifying a processing server 400 that stores the log in the log file indicated by the path (i.e., a host). That is, the corresponding host management table 58 represents which processing server 400 holds each log file. A combination of the host and the path is an example of apparatus management information.

Figure 7A:
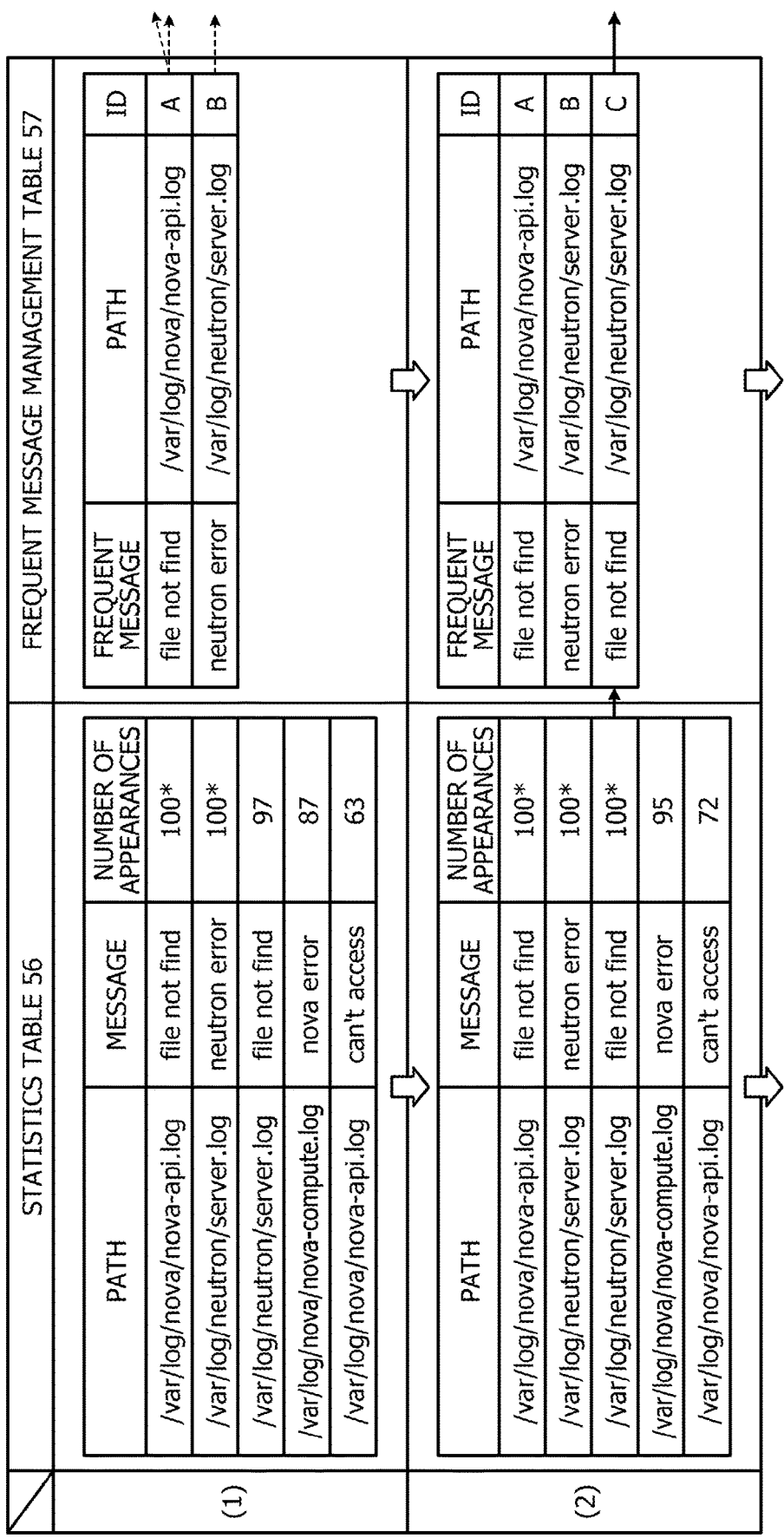
FIGS. 7A and 7B are views illustrating an example of an operation of the information processing system illustrated in FIG. 3.
Figure 7B:
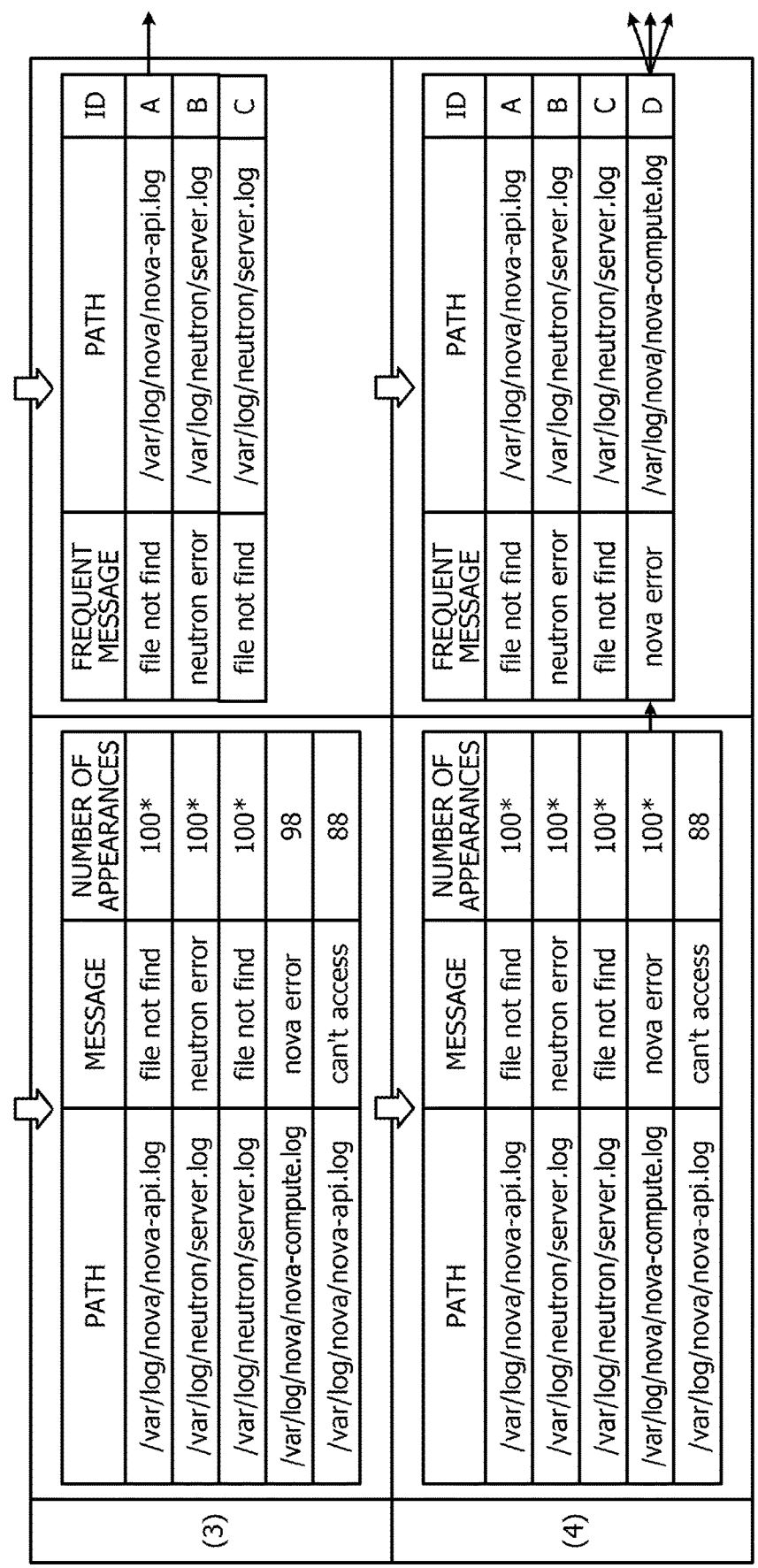

FIGS. 7A and 7B illustrate an example of an operation of the information processing system 102 illustrated in FIG. 3. For the purpose of easy understanding of explanation, it is assumed that only five combinations of paths and messages illustrated in the state (1) are stored in the statistics table 56. That is, it is assumed that a message included in a log received by the management server 500 from each host is one of messages of the five combinations. In addition, for the purpose of easy understanding of explanation, in the statistics table 56, a symbol "*" is attached to a record corresponding to a message whose number of appearances has reached 100.

In the state (1), the five combinations of paths and messages and the number of appearances have already been stored in the statistics table 56 by the frequent log extraction unit 53. For two of the five combinations, the number of appearances of the message has reached 100. The log information management unit 54 determines the message whose number of appearances has reached 100 as a frequent message, and assigns an ID to the frequent message. Then, the log information management unit 54 stores the log management information including a combination of the frequent message, a path, and an ID in the frequent message management table 57.

In the state (1), a broken arrow illustrated in the uppermost record of the frequent message management table 57 indicates that the log management information is transferred to hosts NOVA1 and NOVA2 corresponding to a path "/var/log/nova/nova-api.log". A broken arrow illustrated in the second record from the top of the frequent message management table 57 indicates that the log management information is transferred to a host NEUTRON1 corresponding to a path "/var/log/neutron/server.log".

As indicated by arrows on the right side of each of the states (1) to (4), the log management information stored in the frequent message management table 57 is transferred only to a host corresponding to the path. Therefore, the load on the management network 602 may be reduced as compared with a case where the log management information is transferred to all the hosts of the information processing system 102. In other words, by managing the log management information for each path, it is possible to reduce the update frequency of the frequent message extraction table 49 of each host, thereby reducing the load on the management network 602.

The frequent log extraction unit 53 updates the number of appearances of the statistics table 56 based on a log transferred from any of the hosts. However, a message whose number of appearances has reached 100 is replaced with an ID which is transferred from the host. For example, a message "file not found" held in the path "/var/log/nova/nova-api.log" held in the uppermost record of the statistics table 56 of the state (1) is replaced with an ID (="A") and is transferred from the hosts NOVA1 and NOVA2. Similarly, a message "neutron error" held in the path "/var/log/neutron/server.log" held in the second record from the top of the statistics table 56 of the state (1) is replaced with an ID (="B") and is transferred from the host NEUTRON1. Therefore, after the log management information corresponding to the first and second records from the top of the statistics table 56 of the state (1) is registered in the corresponding host, the number of appearances included in these records does not increase.

In addition, in the state (1), the message "file not found" included in the log stored in the path "/var/log/neutron/server.log" is not set as a frequent message. That is, the frequency of occurrence of the message "file not found" in the log differs depending on the service. Therefore, the host NEUTRON1 transfers the message "file not found" to the management server 500 without replacing the message with an ID. By managing the frequent message for each path, it is possible to manage the log corresponding to the characteristic that the type of frequent message is different for each service, thereby improving the accuracy of extraction of the true frequent log information by the frequent log extraction unit 53.

Next, in the state (2), the number of appearances of the message "file not found" included in the log stored in the path "/var/log/neutron/server.log" reaches 100. The log information management unit 54 detects the message "file not found" of the third record from the top of the statistics table 56 as a frequent message and assigns an ID (="C") to the frequent message. The log information management unit 54 stores the frequent message and path corresponding to the third record from the top of the statistical table 56 and the assigned ID in the frequent message management table 57 as log management information.

The log information management unit 54 issues, to the transfer unit 51, an instruction to transfer the log management information newly stored in the third record from the top of the frequent message management table 57 to the corresponding host. Based on the instruction from the log information management unit 54, the transfer unit 51 transfers the log management information newly stored in the frequent message management table 57 to the host NEUTRON1 corresponding to the path "/var/log/neutron/server.log".

Here, the log information management unit 54 sets a host indicated by the host name held in the record of the corresponding host management table 58 that holds the same path as the path newly stored in the frequent message management table 57 (see, e.g., FIG. 3), as a transfer destination of the log management information. Here, the log management information is transferred to the host NEUTRON1. Thereafter, the host NEUTRON1 that receives the log management information replaces the message "file not found" included in the log stored in the path "/var/log/neutron/server.log" with an ID (="C") which is transferred to the management server 500.

In this manner, the management server 500 may dynamically update the statistics table 56, the frequent message management table 57, and the corresponding host management table 58 that manage frequent messages, based on the actual log received from the processing server 400. That is, since the frequent messages may be automatically updated without manual intervention, the processing server 400 may more efficiently compress logs as compared with a case where the frequent messages are set with anticipation by hands, etc.

Next, in the state (3), for example, the processing load of the service NOVA increases, a host NOVA3 that executes the service NOVA is added, and the service NOVA is executed by the host NOVA3 in addition to the hosts NOVA1 and NOVA2. Then, the management server 500 receives a log output by the service NOVA executed by the host NOVA3. For example, the log transferred from the host NOVA3 is included in the log file "nova-api.log" indicated by the path "/var/log/nova/nova-api.log" and includes the message "file not found".

In a case where a path and a message are stored in the statistics table 56 by the frequent log extraction unit 53, based on a path and a host name added to the log, the log information management unit 54 detects whether an unregistered combination of the path and the host name exists in the corresponding host management table 58. Each time a log is received, the log information management unit 54 refers to the corresponding host management table 58. It is detected whether there is an unregistered combination of the path and the host name in the corresponding host management table 58.

In this example, as illustrated in the state (1) in FIG. 8 (to be described later), a combination of the path "/var/log/nova/nova-api.log" and the host name "NOVA3" is not registered in the corresponding host management table 58. Therefore, the log information management unit 54 registers a new combination of the path "/var/log/nova/nova-api.log"

and the host name "NOVA3" in the corresponding host management table 58. An example in which the corresponding host management table 58 is updated will be described with reference to FIG. 8.

Further, the log information management unit 54 issues, to the transfer unit 51, an instruction to transfer the log management information of the record of the frequent message management table 57 including the path "/var/log/nova/nova-api.log" to the host NOVA3 corresponding to the host name "NOVA3". The transfer unit 51 transfers the log management information including the path "/var/log/nova/nova-api.log" held in the uppermost record of the frequent message management table 57 of the state (3) to the host NOVA3. Thereafter, the host NOVA3 converts the message "file not found" included in the log stored in the path "/var/log/nova/nova-api.log" into an ID (="A") which is transferred to the management server 500. In this way, the management server 500 may use the corresponding host management table 58 to detect the addition of a host, and may transfer the log management information to the added host.

Next, in the state (4), the management server 500 receives a log included in a log file "nova-compute.log" indicated by a path "/var/log/nova/nova-compute.log" from the host NOVA3. The log includes a message "nova error". The frequent log extraction unit 53 stores the extracted message "nova error" in the statistics table 56 together with the path "/var/log/nova/nova-compute.log". Here, it is assumed that the number of appearances of a combination of the message "nova error" and the path "/var/log/nova/nova-compute.log" has reached 100.

The log information management unit 54 detects a message of the fourth record from the top of the state (4) as a frequent message and assigns an ID (="D") to the frequent message. The log information management unit 54 stores the frequent message corresponding to the fourth record from the top, a path, and the assigned ID in the frequent message management table 57 as log management information.

At this point, two combinations of the host names "NOVA1" and "NOVA2" and the path "/var/log/nova/nova-compute.log" have been registered in the corresponding host management table 58. In the meantime, a combination of the host NOVA3 serving as a transfer source of the log including the message "nova error" and the path "/var/log/nova/nova-compute.log" is not held in the corresponding host management table 58. Therefore, the log information management unit 54 registers the combination of the host NOVA3 and the path "/var/log/nova/nova-compute.log" in the corresponding host management table 58. The state (4) is the same as the state of the statistics table 56 and the frequent message management table 57 of FIG. 6.

The log information management unit 54 determines a host to which the log management information newly stored in the fourth record from the top in the frequent message management table 57 of the state (4) is to be transferred, based on the information held in the corresponding host management table 58. The host names "NOVA1", "NOVA2", and "NOVA3" corresponding to the path "/var/log/nova/nova-compute.log" have been registered in the corresponding host management table 58. Therefore, the log information management unit 54 instructs the transfer unit 51 to transfer the log management information newly stored in the frequent message management table 57 to each of the hosts NOVA1 to NOVA3. Based on the instruction from the log information management unit 54, the transfer unit 51 transfers the log management information newly stored in the frequent message management table 57 to the hosts NOVA1 to NOVA3.

Figure 8:
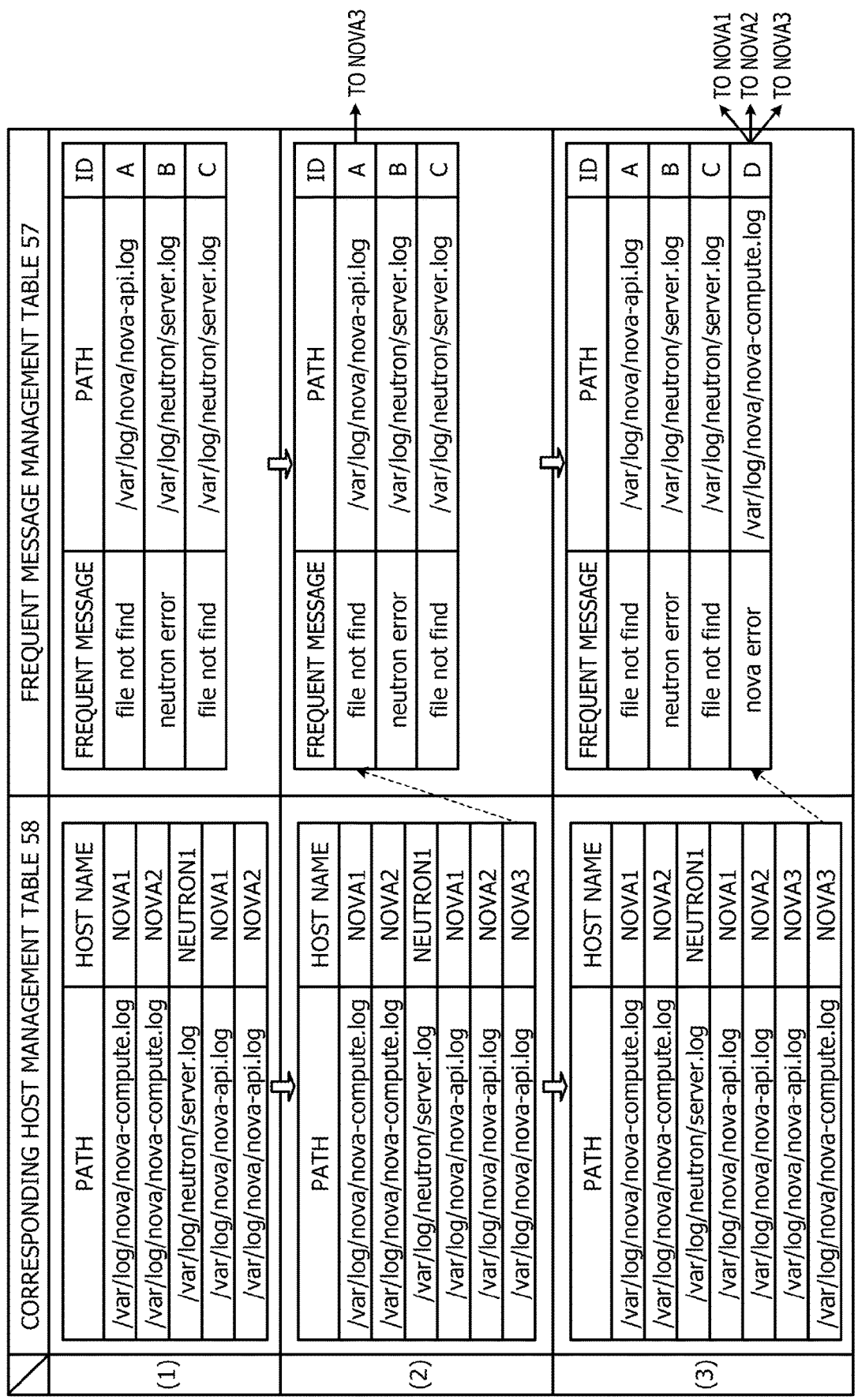
FIG. 8 is a view illustrating an example of an operation of updating the corresponding host management table in the information processing system illustrated in FIG. 3.

FIG. 8 illustrates an example of an operation of updating the corresponding host management table 58 in the information processing system 102 illustrated in FIG. 3.

A state (1) corresponds to the state (2) in FIG. 7A, and the corresponding host management table 58 holds five combinations of paths and host names. As illustrated in the state (2) of FIG. 7A, each message included in the log held in the path "/var/log/nova/nova-compute.log" is not a frequent message since the number of appearances of the message is less than 100. Therefore, in the state (1) of FIG. 8, the path "/var/log/nova/nova-compute.log" held in the first and second records from the top of the corresponding host management table 58 is not registered in the frequent message management table 57.

A state (2) corresponds to the state (3) in FIG. 7B. The management server 500 receives a log that is stored in the path "/var/log/nova/nova-api.log" of the log database 42 of the host NOVA3 with the service NOVA executed by the host NOVA3. The management server 500 detects that a combination of the path "/var/log/nova/nova-api.log" and the host name "NOVA3" added to the log is not registered in the corresponding host management table 58. Then, the management server 500 registers the combination of the path "/var/log/nova/nova-api.log" and the host name "NOVA3" in the corresponding host management table 58. Thereafter, as described in the state (3) of FIG. 7B, the management server 500 transfers the log management information of the record of the frequent message management table 57 including the path "/var/log/nova/nova-api.log" to the host NOVA3.

A state (3) corresponds to the state (4) in FIGS. 6 and 7. The management server 500 receives a log that is stored in the path "/var/log/nova/nova-compute.log" of the log database 42 of the host NOVA3. The management server 500 detects that the number of appearances of a combination of the message "nova error" and the path "/var/log/nova/nova-compute.log" included in the log has reached 100. Therefore, the management server 500 stores the message "nova error", the path "/var/log/nova/nova-compute.log", and an ID (="D") in the frequent message management table 57 as log management information.

The management server 500 detects that the combination of the path "/var/log/nova/nova-compute.log" and the host name "NOVA3" added to the log is not registered in the corresponding host management table 58. Therefore, the management server 500 registers the combination of the path "/var/log/nova/nova-compute.log" and the host name "NOVA3" in the corresponding host management table 58.

The management server 500 transfers the log management information newly stored in the fourth record from the top of the frequent message management table 57 of the state (3) to the corresponding host. At this time, the management server 500 extracts the host names NOVA1, NOVA2, and NOVA3 from the record including the path "/var/log/nova/nova-compute.log" included in the log management information in the corresponding host management table 58. Then, the management server 500 transfers the log management information to the hosts NOVA1, NOVA2, and NOVA3.

FIG. 9 illustrates an example of an operation of the processing server 400 illustrated in FIG. 3. That is, FIG. 9 illustrates an example of an information processing method by the processing server 400 and a program executed by the processing server 400.

First, in step S100, the processing server 400 refers to the log database 42 to determine whether a log file corresponding to a service has been updated when a new log is output from the service execution unit 41. When an updating of the log file is detected, the processing server 400 moves the process to step S102, and repeats the determination of step S100 until an updating of the log file is detected.

In step S102, the processing server 400 accesses the log database 42 to collect logs newly output by the service execution unit 41. When plural log files corresponding to each of plural services are updated, the processing server 400 collects newly stored logs from each of the plural log files. That is, the processing server 400 collects logs for each path (service).

Next, in step S104, the processing server 400 determines whether the frequent message extraction table 49 is vacant. When all the records in the frequent message extraction table 49 are vacant, the processing server 400 is unable to execute the process of detecting a frequent message, and thus moves the process to step S112. When a combination of a frequent message, a path, and an ID is stored in any of the records in the frequent message extraction table 49, the processing server 400 moves the process to step S106 in order to detect a frequent message included in the log.

The process from step S106 to step S110 is executed for each path. In step S106, the processing server 400 determines whether a path of the log collected in step S102 has been registered in the frequent message extraction table 49. When it is determined that the path has been registered in the frequent message extraction table 49, there is a possibility that a frequent message may exist in the log of the target path. Therefore, the processing server 400 records the record in which the path is registered in the frequent message extraction table 49 as a target record, and moves the process to step S108. When it is determined that no path is registered in the frequent message extraction table 49, since no frequent message exists in a log to be searched, the processing server 400 moves the process to step S112.

In step S108, the processing server 400 determines whether the frequent message registered in each target record in the frequent message extraction table 49 is included in the search target log collected in step S102. When it is determined that the frequent message is included in the search target log, the processing server 400 moves the process to step S110 in order to convert the frequent message included in the search target log into an ID. When it is determined that no frequent message is included in the search target log, since no frequent message exists in the search target log, the processing server 400 moves the process to step S112. For example, the process from step S100 to step S108 is executed by the agent 43.

In step S110, the processing server 400 refers to a target record in the frequent message extraction table 49 to convert the frequent message included in the search target log determined in step S108 into an ID, and moves the process to step S112. The processing server 400 stores a log in which the frequent message is replaced with the ID, in the log holding unit 48. For example, the process of step S110 is executed by the conversion unit 44.

By executing the process from step S106 to step S110 for each path, the agent 43 may use only the target record including a path of the log in the frequent message extraction table 49 to determine whether each of all the messages included in the log is a frequent message. As a result, it is possible to improve the search efficiency of frequent messages, as compared with a case of determining frequent messages included in logs by using all the records in frequent message extraction table 49. In addition, when a path of the search target log is not included in the frequent message extraction table 49, since frequent message search is not executed, the search frequency of the frequent message extraction table 49 may be lowered. As a result, the overhead of the agent 43 and the conversion unit 44 may be reduced as compared with a case where a frequent message is commonly set to plural logs corresponding to plural paths without managing the frequent message for each path.

Next, in step S112, the processing server 400 determines whether a predetermined amount of log that is not transferred to the management server 500 has been accumulated in the log holding unit 48. When it is determined that a predetermined amount of log has been accumulated, the processing server 400 instructs the compression of the log and moves the process to step S1142. When it is determined that the predetermined amount of log has not been accumulated, the processing server 400 returns the process to step S100. For example, the process of step S112 is executed by the agent 43.

In step S114, the processing server 400 adds a host name and a path to each log that is not transferred to the management server 500, and compresses the information including the log, the host name, and the path using a data compression algorithm such as a dictionary compression method. For example, the process of step S114 is executed by the compression unit 45. Next, in step S116, the processing server 400 transfers the compressed information including the log, the host name, and the path to the management server 500, and returns the process to step S100. For example, the process of step S116 is executed by the transfer unit 46.

FIG. 10 illustrates an example of an operation of the management server 500 illustrated in FIG. 3. That is, FIG. 10 illustrates an example of an information processing method by the management server 500 and a program executed by the management server 500.

First, in step S200, upon receiving a log from any one of the processing servers 400, the management server 500 transfers the received log to the decompression unit 52 and moves the process to step S202. When a log is not received, the management server 500 repeats the determination in step S200. For example, the process of step S200 is executed by the transfer unit 51.

In step S202, the management server 500 decompresses the log received from any of the processing servers 400, and stores the log obtained by the decompression and a host name and a path added to the log in the log holding unit 59. For example, the log decompression in step S202 is executed by the decompression unit 52 using a data compression algorithm such as a dictionary compression method.

Next, in step S204, when the predetermined time has elapsed, the management server 500 moves the process to step S206. When the predetermined time has not elapsed, the management server 500 returns the process to step S200. For example, the predetermined time is longer than the reception interval of the log received in step S200 (i.e., the transmission interval of the log by the processing server 400). The predetermined time is repeatedly measured every time a certain period of time elapses. By executing a process after step S206 every a certain period of time longer than the log reception interval, the number of messages extracted may be increased as compared with a case where the process after step S206 is executed every time a log is received. Therefore, it is possible to increase the increment of the number of appearances of messages for each path, thereby reducing the frequency of the process after step S206 executed for detecting frequent messages. As a result, it is possible to reduce the load on the frequent log extraction unit 53 and the log information management unit 54.

In step S206, the management server 500 searches the log obtained by the decompression in step S202 and extracts all the messages included in the log. The management server 500 does not re-search a log once the message has been extracted. In addition, the management server 500 may execute the process of step S206 every time a log is received from any of the processing servers 400 without waiting for the elapse of a certain period of time.

Next, in step S208, the management server 500 determines whether each of plural combinations of messages and paths extracted in step S206 has been registered in the statistics table 56. When it is determined that all of the plural combinations of messages and paths have been registered in the statistics table 56, the management server 500 moves the process to step S212. When it is determined that at least one of the plural combinations of messages and paths has not been registered in the statistics table 56, the management server 500 moves the process to step S210. Since the process of step S208 is executed by searching only the record including a determination target path in the statistics table 56, the number of searches may be reduced as compared with a case where all the records are searched, thereby improving the search efficiency.

In step S210, the management server 500 registers an unregistered combination of message and path that is determined in step S208 in the statistics table 56, and moves the process to step S212. In step S212, the management server 500 updates the number of appearances held in the statistics table 56, based on the determination result in step S208. For example, when a combination of extracted message and path has already been registered in the statistics table 56, the management server 500 increments by "1" the number of appearances held in the record that holds the extracted message and path in the statistics table 56. When the combination of extracted message and path is not registered in the statistics table 56, the management server 500 increments from an initial value "0" to "1" the number of appearances held in a record in which a message and a path are newly registered in step S210, in the statistics table 56. For example, the process of step S206 to step S212 is executed by the frequent log extraction unit 53.

Next, in step S214, the management server 500 determines whether a combination of message and path whose number of appearances has reached a threshold value (e.g., 100) is present in the statistics table 56. When it is determined that a combination of message and path whose number of appearances has reached the threshold value is present in the statistics table 56, the management server 500 moves the process to step S222. When it is determined that no combination of message and path whose number of appearances has reached the threshold value is present in the statistics table 56, the management server 500 moves the process to step S216. In the actual process of step S214, the process is moved to step S222 or step S216 for each record based on the number of appearances held in each record of the statistics table 56.

When the frequent log extraction unit 53 extracts a combination of message and path whose number of appearances has once reached the threshold value, the movement to the step S216 is always determined in the process of the step S214. Whether the number of appearances has reached the threshold value is determined by referring to the number of appearances held in the statistics table 56. However, a message whose number of appearances has once reached the threshold value is converted into an ID by the processing server 400. Therefore, the case where the management server 500 receives a message whose number of appearances has once reached the threshold value is limited to a period until the corresponding log management information is registered in the frequent message extraction table 49 of the processing server 400 after the number of appearances of the message reaches the threshold value.

In step S216, the management server 500 refers to the log holding unit 59 to determine whether a combination of a path indicating a storage location in which the log obtained by the decompression in step S202 is stored and a host name indicating a transmission source of the log has been registered in the corresponding host management table 58. When it is determined that the combination has been registered in the corresponding host management table 58, the management server 500 returns the process to step S200 since the combination has already been set as a transfer target of the log management information. When it is determined that the combination has not been registered in the corresponding host management table 58, the management server 500 moves the process to step S218 since the combination has not been set as the transfer target of the log management information. In step S218, the management server 500 registers the combination of path and host name, which is determined as unregistered in step S216, in the corresponding host management table 58, and moves the process to step S220.

In step S220, the management server 500 transmits the log management information that is held in the frequent message management table 57 corresponding to a path newly registered in step S218, to a host indicated by a host name newly registered in step S218. Thus, when a host is added, the log management information corresponding to a log output by a service executed by the added host may be promptly transferred to the added host. After step S220, the process returns to step S200.

In step S222, the management server 500 assigns an ID to the combination of message and path whose number of appearances determined in step S214 has reached the threshold value. In addition, the management server 500 registers the combination of message and path to which the ID is assigned, together with the ID, in a vacant record of the frequent message management table 57 as log management information, and moves the process to step S224.

In step S224, the management server 500 determines whether the combination of the path indicating the storage location, in which the log including the message whose number of appearances has reached the threshold value is stored, and the host of the transmission source of the log has been registered in the corresponding host management table 58. When it is determined that the combination has been registered in the corresponding host management table 58, the management server 500 moves the process to step S228. When it is determined that the combination has not been registered in the corresponding host management table 58, the management server 500 moves the process to step S226 in order to register the combination in the corresponding host management table 58. In step S226, the management server 500 registers, in the corresponding host management table 58, the combination of the path indicating the storage location, in which the log including the message whose number of appearances has reached the threshold value is stored, and the host of the transmission source of the log, and moves the process to step S228.

In step S228, the management server 500 refers to the corresponding host management table 58 to search for a host name held by a record that includes the same path as the path included in the log management information newly registered in step S222. The management server 500 transfers the log management information registered in step S222 to a host indicated by the host name found by the search, and moves the process to step S200. As a result, it is possible to transfer the log management information to all the hosts corresponding to a path that indicates the storage location in which the log including the message whose number of appearances has reached the threshold value is stored. In addition, even when the number of appearances of a message included in a log received from an unregistered host in the corresponding host management table 58 has reached the threshold value, the log management information may be transferred to all the target hosts including the unregistered host.

As described above, the second embodiment illustrated in FIGS. 3 to 10 may also achieve the same effects as those of the first embodiment illustrated in FIGS. 1 and 2. For example, by managing a frequent message for each path, the agent 43 may improve the search efficiency of frequent messages, as compared with a case where frequent messages are not managed for each path, thereby reducing the search frequency of the frequent message extraction table 49. Therefore, the overhead of the processing server 400 may be reduced while reducing the load on the management network 602 to which logs are transmitted, as compared with a case where frequent messages are not managed for each path.

In addition, the management server 500 may dynamically update the statistics table 56, the frequent message management table 57, and the corresponding host management table 58 that manage frequent messages, based on the actual log received from the processing server 400. That is, since frequent messages may be automatically updated without manual intervention, the processing server 400 may more efficiently compress the logs as compared with a case where frequent messages are set with anticipation by hands or the like.

By managing the frequent message for each path, it is possible to manage the log corresponding to the characteristic that the type of frequent message is different for each service, thereby improving the accuracy of extraction of the true frequent log information. By installing the frequent message management table 57 separately from the statistics table 56, the management server 500 may acquire only log management information including a frequent message, a path, and an ID only with an access to a corresponding record of the frequent message management table 57.

Furthermore, in the second embodiment illustrated in FIGS. 3 to 10, even when a processing server 400 that executes the common service is added, by utilizing the fact that the path is common, logs stored in physically different storage locations may be managed as a log for each service. In other words, even in a case where a processing server 400 that executes the common service is added, logs stored in physically different storage locations may be managed as a log for each service without notifying the management server 500 of the addition of a processing server 400. Further, the operation flow of the management server 500 may be configured to be the same before and after the addition of the processing server 400.

By managing the log management information for each path, it is possible to reduce the load on the management network 602 as compared with a case where log management information is transferred to all hosts of the information processing system 102. In other words, by managing the log management information for each path, it is possible to reduce the update frequency of the frequent message extraction table 49 of each host, thereby reducing the load on the management network 602.

By operating the frequent log extraction unit 53 and the log information managing unit 54 every a certain period of time longer than the log reception interval, it is possible to reduce the frequency of a process after step S206 in FIG. 10 executed for detecting frequent messages. As a result, it is possible to reduce the load on the frequent log extraction unit 53 and the log information managing unit 54.

FIG. 11 illustrates an example of a hardware configuration of the management apparatus 20 illustrated in FIG. 1 and the management server 500 illustrated in FIG. 3. Since the management apparatus 20 and the management server 500 have the same hardware configuration, the configuration of the management server 500 will be described below. The log transmission apparatus 10 illustrated in FIG. 1 and the processing server 400 and the terminal device 700 illustrated in FIG. 3 also have the same or similar hardware configurations as those in FIG. 11.

The management server 500 includes a main body 70 such as a mother board, and a monitor 80, a mouse 82, and a keyboard 84 which are connected to the main body 70. The main body 70 includes a processor 71 such as a CPU, memories 72 and 73, a graphic processing unit 74, an HDD (Hard Disk Drive) 75, an input interface 76, an input/output interface 77, and a communication interface 78 which are all interconnected via a bus BUS. The main body 70 may have an FPGA.

The processor 71 has plural processor cores 71a that execute arithmetic processing. The main unit 70 may include plural processors 71. Either of the processor cores 71a implements the function of the management apparatus 20 illustrated in FIG. 1 or the management server 500 illustrated in FIG. 3 by executing a program. When plural processors 71 are installed in the main body 70, the program may be executed by one of the plural processors 71.

For example, the memory 72 is a memory module on which plural SDRAMs are mounted, and the memory 73 is a flash memory. The graphic processing unit 74 outputs image data or the like to be displayed on the monitor 80 to the monitor 80 based on an instruction from the processor 71. The HDD 75 holds various programs and the like executed by the processor 71. The processor 71 executes various programs transferred from the HDD 75 to the memory 72.

The input interface 76 transmits signals received from the input devices such as the mouse 82 and the keyboard 84 to the processor 71. Based on an instruction from the processor 71, the input/output interface 77 reads information such as various programs or data from a recording medium 86 and writes the read information in the HDD 75 or the like. Further, the input/output interface 77 reads the information stored in the HDD 75 or the like based on an instruction from the processor 71, and writes the read information in the recording medium 86. The recording medium 86 is a CD (Compact Disc)®, a DVD (Digital Versatile Disc)®, a USB (Universal Serial Bus) memory, or the like. The communication interface 78 exchanges information with other apparatuses connected to a network via a network such as the management network 602.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
a first memory;
a second memory; and
a processor coupled to the first and second memories and the processor configured to:
receive a first log from a first transmission apparatus of one or more log transmission apparatuses;
determine target log information among plural pieces of log information included in the first log, the target log information being one of first pieces among the plural pieces of log information, the first pieces of log information having an occurrence frequency higher than an occurrence frequency of other pieces among the plural pieces of log information;
assign an identifier to the target log information, the identifier identifying the target log information;
store log management information that indicates a correspondence among the target log information, the identifier, and a first path in the second memory, the first path being received together with the first log and indicating a storage location in which the first log is stored;
transmit the log management information to a second log transmission apparatus among the one or more log transmission apparatuses, the second log transmission apparatus corresponding to the first path; and
receive, from the second log transmission apparatus, a log in which the target log information is converted into the identifier based on the log management information in which the target log information and the identifier are provided corresponding to the first path.

2. The information processing apparatus according to claim 1, wherein the processor is further configured to:
store a number of times of reception of log information in the first memory for each combination of the first path and each of the plural pieces of log information included in the first log;
determine log information whose number of times of reception has reached a predetermined threshold value as the target log information, and assign the identifier to the determined target log information; and
transmit the log management information that includes the assigned identifier to the second log transmission apparatus that corresponds to the first path included in the log management information that includes the assigned identifier each time the identifier is assigned.

3. The information processing apparatus according to claim 2, wherein the processor is further configured to:
store each of the plural pieces of log information, the first path, and the number of times of reception in one of plural storage areas of the first memory based on the first log; and
store log information stored in a first storage area of the first memory in a vacant storage area of the second memory as target log information together with the first path and the assigned identifier, the first storage area storing the number of times of reception that has reached the predetermined threshold value.

4. The information processing apparatus according to claim 3, wherein the processor is further configured to update information stored by the first memory and the second memory based on plural logs received from the one or more log transmission apparatuses every first period of time longer than an interval of receiving a log from the one or more log transmission apparatuses.

5. The information processing apparatus according to claim 1, wherein the processor is further configured to:
store apparatus management information that indicates a combination of each of the one or more log transmission apparatuses and a path that corresponds to each of the one or more log transmission apparatuses in a third memory; and
transmit, when the apparatus management information indicates a combination of the first path and plural log transmission apparatuses, the log management information that corresponds to the first path to the plural log transmission apparatuses.

6. The information processing apparatus according to claim 1, wherein the processor is further configured to:
transmit, upon detecting a new combination of a second log transmission apparatus and the first path based on a received second log, the log management information including the first path to the second log transmission apparatus.

7. The information processing apparatus according to claim 1, wherein a size of data of the identifier is smaller than a size of data of the target log information.

8. An information processing system comprising:
a first information processing apparatus including:
a first memory; and
a first processor coupled to the first memory; and
a second information processing apparatus including:
a second memory; and
a second processor coupled to the second memory,
the first processor is configured to:
receive log management information from the second information processing apparatus, the log management information indicating a correspondence between target log information and an identifier that identifies the target log information, the target log information being one of first pieces among plural pieces of log information included in a first log, the first pieces of log information having an occurrence frequency higher than an occurrence frequency of other pieces among the plural pieces of log information;
determine whether first log information matches the target log information included in the log management information, the first log information being included in a log stored in a storage location indicated by a path included in the log management information;
convert, when it is determined that the first log information matches the target log information, the target log information into the identifier; and
transmit a log that includes the identifier converted from the target log information to the second information processing apparatus, and
the second processor is configured to:
store the log management information in the second memory;
transmit the log management information to the first information processing apparatus; and receive the log in which the target log information is converted into the identifier based on the log management information in which the target log information and the identifier are provided corresponding to the path.

9. A non-transitory computer-readable recording medium having stored therein a program that causes a computer to execute a process, the process comprising:
  receiving a first log from a first transmission apparatus of one or more log transmission apparatuses;
  determining target log information among plural pieces of log information included in the first log, the target log information being one of first pieces among the plural pieces of log information, the first pieces of log information having an occurrence frequency higher than an occurrence frequency of other pieces among the plural pieces of log information;
  assigning an identifier to the target log information, the identifier identifying the target log information;
  storing log management information that indicates a correspondence among the target log information, the identifier, and a first path in a memory, the first path being received together with the first log and indicating a storage location in which the first log is stored;
  transmitting the log management information to a second log transmission apparatus among the one or more log transmission apparatuses, the second log transmission apparatus corresponding to the first path; and
  receiving, from the second log transmission apparatus, a log in which the target log information is converted into the identifier based on the log management information in which the target log information and the identifier are provided corresponding to the first path.

10. The information processing apparatus according to claim 1, wherein each of the target log information and the identifier is provided with a one-to-one match with the first path.

11. The information processing system according to claim 8, wherein each of the target log information and the identifier is provided with a one-to-one match with the first path.

12. The non-transitory computer-readable recording medium according to claim 9, wherein each of the target log information and the identifier is provided with a one-to-one match with the first path.

13. The information processing apparatus according to claim 1, wherein the target log information has the occurrence frequency higher than the occurrence frequency of other pieces among the plural pieces of log information.

14. The information processing system according to claim 8, wherein the target log information has the occurrence frequency higher than the occurrence frequency of other pieces among the plural pieces of log information.

15. The non-transitory computer-readable recording medium according to claim 9, wherein the target log information has the occurrence frequency higher than the occurrence frequency of other pieces among the plural pieces of log information.

* * * * *